(12) United States Patent
Baraniuk et al.

(10) Patent No.: US 8,717,551 B2
(45) Date of Patent: May 6, 2014

(54) ADAPTIVE SEARCH FOR ATYPICAL REGIONS IN INCIDENT LIGHT FIELD AND SPECTRAL CLASSIFICATION OF LIGHT IN THE ATYPICAL REGIONS

(71) Applicant: InView Technology Corporation, Austin, TX (US)

(72) Inventors: Richard G. Baraniuk, Houston, TX (US); Tyler H. Weston, Austin, TX (US)

(73) Assignee: InView Technology Corporation, Austin, TX (US)

( * ) Notice: Subject to any disclaimer, the term of this patent is extended or adjusted under 35 U.S.C. 154(b) by 0 days.

(21) Appl. No.: 13/631,626

(22) Filed: Sep. 28, 2012

(65) Prior Publication Data

US 2013/0083312 A1    Apr. 4, 2013

Related U.S. Application Data

(60) Provisional application No. 61/541,582, filed on Sep. 30, 2011.

(51) Int. Cl.
*G01J 1/42* (2006.01)
*G01J 3/28* (2006.01)

(52) U.S. Cl.
USPC .................. 356/121; 356/124.5; 356/402

(58) Field of Classification Search
USPC .............. 356/121, 121.5, 51, 402, 124.5; 348/226.1, 369; 345/104
See application file for complete search history.

(56) References Cited

U.S. PATENT DOCUMENTS

| | | | |
|---|---|---|---|
| 7,286,111 B2* | 10/2007 | Stephenson, III | 345/104 |
| 2008/0158437 A1* | 7/2008 | Arai et al. | 348/742 |
| 2010/0056928 A1* | 3/2010 | Zuzak et al. | 600/476 |
| 2012/0038789 A1* | 2/2012 | Kelly et al. | 348/226.1 |
| 2012/0038805 A1 | 2/2012 | Kelly et al. | |
| 2012/0241597 A1 | 9/2012 | Bridge et al. | |

OTHER PUBLICATIONS

U.S. Appl. No. 61/372,826, entitled "Compressive Sensing Systems and Methods", filed Aug. 11, 2010, invented by Richard G. Baraniuk et al.
"Quadtree;" Wikipedia, last modified on Dec. 16, 2012, retrieved from <http://en.wikipedia.org/wiki/Quadtree> on Dec. 18, 2012; pp. 1-7.

(Continued)

*Primary Examiner* — Sang Nguyen
(74) *Attorney, Agent, or Firm* — Meyertons Hood Kivlin Kowert & Goetzel, P.C.; Jeffrey C. Hood; Mark K. Brightwell

(57) ABSTRACT

A system and method for searching an incident light field for atypical regions (e.g., hot spots or cool spots or spectrally distinctive regions) within the incident light field using a light modulator and a spectral sensing device. Once the atypical regions are identified, the light modulator may be used to mask the incident light field so that the spectral sensing device can make spatially-concentrated measurements of the wavelength spectrum of the atypical regions (or alternatively, the exterior of the atypical regions). Furthermore, in a compressive imaging mode, a sequence of spatial patterns may be supplied to the light modulator, and a corresponding sequence of wavelength spectra may be collected from the spectral sensing device. The wavelength spectra comprise a compressed representation of the incident light field over space and wavelength. The wavelength spectra may be used to reconstruct a multispectral (or hyperspectral) data cube.

38 Claims, 22 Drawing Sheets

(56) References Cited

OTHER PUBLICATIONS

"Spectrometer;" Wikipedia, last modified on Dec. 16, 2012, retrieved from <http://en.wikipedia.org/wiki/Spectrometer> on Dec. 18, 2012; pp. 1-5.

Ndili et al.; "Coding Theoretic Approach to Image Segmentation;" IEEE International Conference on Image Processing—ICIP 2001, Thessaloniki, Greece, retrieved from <http://www.lx.it.pt/~mtf/NdiliNowakFigueiredoICIP2001.pdf> on Dec. 18, 2012; pp. 1-4.

Haupt et al.; "Distilled Sensing: Adaptive Sampling for Sparse Detection and Estimation;" Rice University ECE Technical Report TREE1001, manuscript revised May 27, 2010, retrieved from <http://arxiv.org/abs/1001.5311v2> on Dec. 18, 2012; pp. 1-23.

Haupt et al.; "Compressive Distilled Sensing: Sparse Recovery Using Adaptivity in Compressive Measurements;" 43rd Asilomar Conference on Signals, Systems, and Computers, Pacific Grove, CA/USA, Oct. 2009; pp. 1-5.

Sankaranarayanan et al; "Compressive Acquisition of Dynamic Scenes;" European Conference on Computer Vision, Heraklion, Crete, Greece, Sep. 2010; pp. 1-14.

Reed, Irving S.; Yu, Xiaoli; "Adaptive multiple-band CFAR detection of an optical pattern with unknown spectral distribution," IEEE Trans. on Acoustics, Speech and Signal Proc., vol. 38, No. 10, pp. 1760-1770, Oct. 1990; pp. 1-11.

Kanaev et al., "Reduction of False Alarms Caused by Background Boundaries in Real Time Subspace RX Anomaly Detection;" Proceedings of the International Society for Optics and Photonics (SPIE) vol. 7334, 733405-1, published Apr. 24, 2009, ISBN: 9780819476005; pp. 1-11.

Kwon, Heesung; Nasrabadi, Nasser M.; "Kernel RX-Algorithm: A Nonlinear Anomaly Detector for Hyperspectral Imagery;" IEEE Transactions on Geoscience and Remote Sensing, vol. 43, No. 2, Feb. 2005; pp. 1-10.

D. Stein et al.; "Anomaly Detection from Hyperspectral Imagery;" IEEE Signal Processing Magazine, special issue on Hyperspectral Imaging, Jan. 2002; pp. 58-69.

\* cited by examiner

1500

1510
search an intensity field of an incident light stream to identify a region of relatively high intensity, wherein said searching is based on a tree of spatial subsets of the intensity field, wherein, for a current depth level k of the tree, said searching the incident light field includes:

modulating the incident light stream with a first sequence of spatial patterns to obtain a modulated light stream, wherein the spatial patterns correspond to child subsets at the current depth level k whose parent subsets are search survivors at the previous depth level k-1
1520 computing a histogram of measurements of intensity of the modulated light stream
1525 selecting search survivors at the current depth level k from the child subsets, wherein the search survivors at the current depth level k correspond to the top P(k) percent of the intensity measurements in the histogram, where P(k) is a positive threshold value
1530

*FIG. 15*

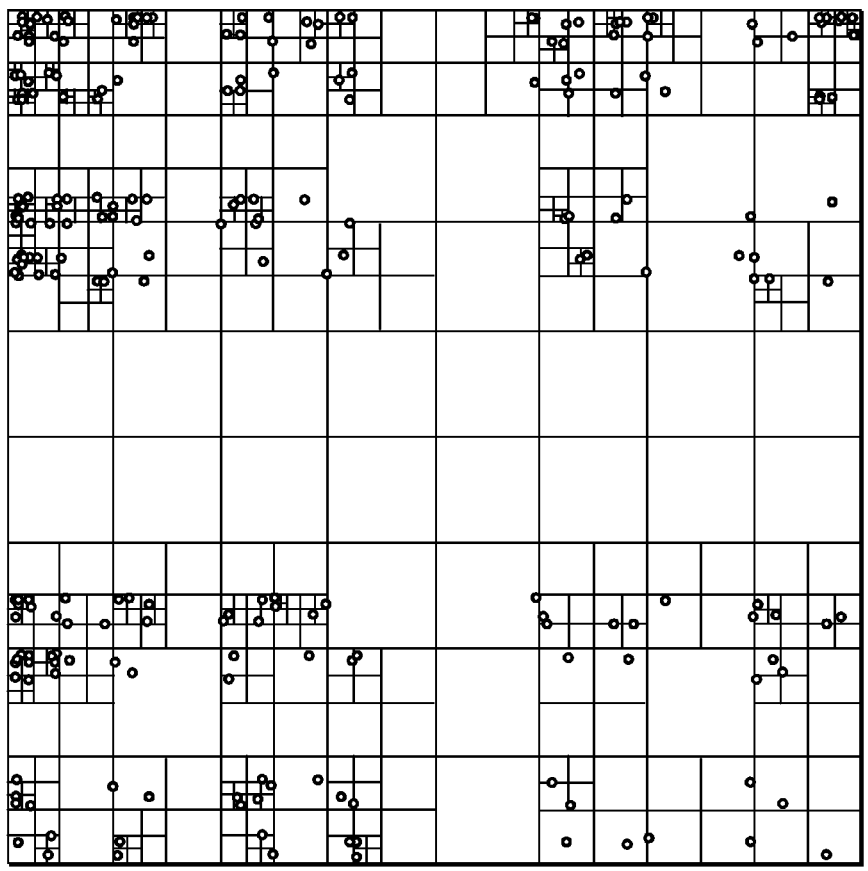

*FIG. 16*

ADAPTIVE SEARCH FOR ATYPICAL REGIONS IN INCIDENT LIGHT FIELD AND SPECTRAL CLASSIFICATION OF LIGHT IN THE ATYPICAL REGIONS

RELATED APPLICATION DATA

This application claims the benefit of priority to U.S. Provisional Application No. 61/541,582, filed on Sep. 30, 2011, entitled "Adaptive Imaging Architecture and Algorithms for Hyperspectral Image-based Classification for Chemical Plume Analysis", invented by Richard G. Baraniuk and Tyler H. Weston, which is hereby incorporated by reference in its entirety as though fully and completely set forth herein.

This invention was made with government support under Contract No. FA9453-11-M-0117 awarded by the Airforce Research Laboratory. The government has certain rights in the invention.

FIELD OF THE INVENTION

The present invention relates to the fields of spectrometry, and more particularly, to mechanisms for searching an incident light field to determine atypical regions within the light field, and mechanisms for classifying the wavelength spectrum of light in the atypical regions.

DESCRIPTION OF THE RELATED ART

According to Nyquist theory, a signal x(t) whose signal energy is supported on the frequency interval [−B,B] may be reconstructed from samples {x(nT)} of the signal x(t), provided the rate $f_S=1/T_S$ at which the samples are captured is sufficiently high, i.e., provided that $f_S$ is greater than 2B. Similarly, for a signal whose signal energy is supported on the frequency interval [A,B], the signal may be reconstructed from samples captured with sample rate greater than B−A. A fundamental problem with any attempt to capture a signal x(t) according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx, mΔy)} captured along a rectangular grid, the horizontal and vertical densities 1/Δx and 1/Δy should be respectively greater than $2B_x$ and $2B_y$, where $B_x$ and $B_y$ are the highest x and y spatial frequencies occurring in the image I(xy). The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts include the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i): i=1, 2, ..., M} in the N-dimensional space, where M is larger than K but still much smaller than N. Each projection gives a corresponding real number s(i), e.g., according to the expression $$s(i) = <v, R(i)>,$$

where the notation <v,R(i)> represents the inner product (or dot product) of the vector v and the vector R(i). Thus, the series of M projections gives a vector U including M real numbers: $U_i=s(i)$. Compressive sensing theory further prescribes methods for reconstructing (or estimating) the vector v of N samples from the vector U of M real numbers. For example, according to one method, one should determine the vector x that has the smallest length (in the sense of the $L_1$ norm) subject to the condition that $\Phi Tx=U$, where $\Phi$ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. Pat. No. 8,199,244, issued Jun. 12, 2012 (invented by Baraniuk et al.) and illustrated in FIG. 1, an imaging device (e.g., camera) may be configured to take advantage of the compressive sensing paradigm by using a digital micromirror device (DMD) 40. (See also M. F. Duarte, M. A. Davenport, D. Takhar, J. N. Laska, T. Sun, K. F. Kelly, and R. G. Baraniuk, "Single-pixel imaging via compressive sampling", IEEE Signal Processing Magazine, vol. 25, no. 2, pp. 83-91, March, 2008.) An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements {s(i)} that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the sake of discussion that the DMD comprises a rectangular array, the DMD implements a spatial modulation of the incident light field so that the light field leaving the DMD in the direction of the lens 50 might be modeled by $$\{I(n\Delta x, m\Delta y, t) * M(n,m,t)\}$$

where m and n are integer indices, where $I(n\Delta x, m\Delta y, t)$ represents the portion of the light field that is incident upon that $(n,m)^{th}$ mirror of the DMD at time t. The function $M(n,m,t)$ represents the orientation of the $(n,m)^{th}$ mirror of the DMD at time t. At sampling times, the function $M(n,m,t)$ equals one or zero, depending on the state of the digital control signal that controls the $(n,m)^{th}$ mirror. The condition $M(n,m,t)=1$ corresponds to the orientation state that reflects onto the path that leads to the lens 50. The condition $M(n,m,t)=0$ corresponds to the orientation state that reflects away from the lens 50.

The lens 50 concentrates the spatially-modulated light field $$\{I(n\Delta x, m\Delta y, t) * M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

In a compressive sensing (CS) device such as that described above, the quality of image reconstruction may suffer if there are intensely bright spots in the incident light field (e.g., due to the presence of the sun or reflections of the sun in the field of view). The bright spots may make it more difficult to detect the small scale variations in signal S(t) that are needed to reconstruct the remaining portions of the incident light field. Thus, there exists a need for mechanisms capable of decreasing (or eliminating) the negative effects of excessively bright spots in the incident light field.

Alternatively, in some circumstances, the brighter or warmer portions of the external scene may be the interesting or information-bearing portions. For example, when viewing a scene at night in the infrared band, a warm (bright) object may be more interesting than the cooler (darker) background. A warm chemical plume due to a chemical reaction occurring the environment may be more interesting than the cooler background. Thus, one may be interested in "zooming in" on a warm or bright object in the scene, and selectively imaging and/or measuring that object while excluding the remainder of the scene.

Another field in the prior art is the field of spectrometry, where one is interested in measuring the wavelength spectrum of incident light (e.g., light produced by a chemical plume or a chemical reaction). A spectrometer receives the incident light and captures the wavelength spectrum. The wavelength spectrum may be analyzed to classify and/or identify the source of the incident light. One problem however is that the feature of interest (e.g., a chemical plume) may occur in only a portion of the field of view of the incident light stream. Thus, the remainder of the field of view may contribute noise to the spectral measurement. For example, one may be interested in analyzing the spectra of any chemical plumes occurring in an external environment without knowing beforehand where the chemical plume will occur. Therefore, there exists a need for mechanisms capable of making spectral measurements that are concentrated spatially on events or features of interest occurring in the environment or the scene under observation.

SUMMARY

A system and method for searching an incident light field is disclosed herein. The search identifies atypical regions (e.g., bright spots or relatively cool spots or spectrally distinctive regions) within the incident light field using a light modulator and a spectral sensing device. Once the atypical regions are identified, the light modulator may be used to mask the incident light field so that the spectral sensing device can make spatially-concentrated measurements of the wavelength spectrum in the atypical regions (or alternatively, in the exterior of the atypical regions). Furthermore, in a compressive imaging mode, a sequence of spatial patterns may be supplied to the light modulator, and a corresponding sequence of wavelength spectra may be collected from the spectral sensing device. The wavelength spectra comprise a compressed representation of the incident light field over wavelength and over one or more spatial dimensions. The wavelength spectra may be used to reconstruct a multispectral (or hyperspectral) data cube.

In one set of embodiments, a system for performing spectral identification and/or classification on an incident light stream may be configured using a light modulation unit (such as a digital micromirror device), a spectral sensing device (such as a spectrometer) and a processing unit. The incident light stream may represent a view of a scene under observation or analysis. The light modulation unit includes an array of light modulating elements, and may be configured to modulate the incident light stream with a sequence of spatial patterns to obtain a modulated light stream. The spectral sensing device may be configured to capture a sequence $\{I_j(\lambda)\}$ of wavelength spectra of the modulated light stream over time. (Index j is the sequence index.) Each wavelength spectrum $I_j(\lambda)$ of the sequence represents intensity versus wavelength. The wavelength spectrum $I_j(\lambda)$ may be outputted from the spectral sensing device as a vector of intensity values corresponding to respective wavelength intervals.

In some embodiments, the system may be employed to identify or classify the wavelength spectrum of one or more atypical regions within the intensity field of the incident light stream. (The intensity field may be interpreted as the pattern of intensity occurring over the modulating surface of the light modulation unit due to the incident light stream. The modulating surface of the light modulation unit is defined by the array of light modulating elements.) For example, an atypical region may be a region of the intensity field that has higher average temperature than the remainder of the intensity field. (A chemical plume produced by a chemical reaction may have higher average temperature than its surroundings.) As another example, an atypical region may be a region of the intensity field that has lower average temperature than the remainder of the intensity field. (An endothermic chemical reaction may produce a chemical plume that is cooler than ambient temperature.) As another example, an atypical region may be a region of the intensity field that has a distinct spectral pattern or characteristic than the remainder of the intensity field. (A particular object of interest such as a human being or a vehicle or aircraft may have distinctive wavelength spectrum compared to the scene background.)

The system may be configured to search the intensity field for the one or more atypical regions. The search may be performed by supplying spatial patterns to the light modulation unit and analyzing the corresponding wavelength spectra captured by the spectral sensing device. Instead of performing an exhaustive search (e.g., a fine-scale raster scan of the entire intensity field), the processing unit may perform an adaptive search that selects new spatial patterns (for the light modulation unit) based on an analysis of the wavelength spectra corresponding to previously-supplied spatial patterns. The search may be based on a tree of subsets of the intensity field (i.e., a tree of subsets of the array of light modulating elements). For example, the tree may be a quadtree corresponding to a recursive partitioning of the intensity field into rectangles. The search identifies a spatial subset of the intensity field that at least partially contains the one or more atypical regions. The spatial subset may be a union of one or more subsets (nodes) from the tree.

Having identified the spatial subset, a specialized spatial pattern may be supplied to the light modulation unit in order to reject portions of the incident light stream that are outside the spatial subset and to admit portions of the incident light stream that are inside the spatial subset, thereby producing a restricted light stream. Thus, the light modulation unit may serve as a programmable aperture or mask. The spectral sensing device may capture a wavelength spectrum of the restricted light stream. The processing unit may execute a spectral classification algorithm on the wavelength spectrum in order to classify the wavelength spectrum into one of a plurality of classes. For example, the classes may represent different types of chemical plumes or chemical reactions. In a petroleum refinery, the classes may represent the types of chemical plume that could result from the malfunction of various processes within the refinery. In a military application, the classes may represent the types of radiation spectra that result from the firing or explosion of various munitions, the exhaust of various types of vehicle or aircraft, etc. In an astronomical application, the classes may represent the types of radiation spectra that are produced by various types of astronomical objects.

If the class into which the wavelength spectrum has been classified is a class of interest, the processing unit may perform a refined search of the intensity field of the incident light stream to determine a refined spatial subset that more accurately contains the one or more atypical regions within the intensity field. For example, the processing unit may resume the tree-based search from the last level of depth visited in the original search, and progress to a deeper level so that the resulting spatial subset is more finely resolved. Having determined the refined spatial subset, the processing unit may direct the light modulation unit to modulate the incident light stream with a second specialized pattern to obtain a second restricted light stream, where the second specialized pattern is restricted to the refined spatial subset. Furthermore, the processing unit may execute the spectral classification algorithm (or perhaps a different spectral classification algorithm) on a restricted wavelength spectrum generated by the spectral sensing device in response to the second restricted light stream. The action of executing the spectral classification algorithm on the second restricted wavelength spectrum classifies the second restricted wavelength spectrum relative to the plurality of classes (or perhaps, relative to a refined collection of classes).

In some embodiments, the one or more atypical regions of the intensity field have higher light intensity (or temperature) than an exterior of the one or more atypical regions. Furthermore, the process of searching the intensity field of the incident light stream may be based on a tree of subsets of the array of light modulating elements. (A parent subset includes each of its child subsets. The size of the subsets is a decreasing function of depth level within the tree.) For a current depth level k of the tree, the processing unit may inject current spatial patterns into the sequence of spatial patterns being applied to the incident light stream by the light modulation unit. The current spatial patterns correspond to child subsets at the current depth level k whose parent subsets are search survivors at the previous depth level k−1. The above-described process of selecting new spatial patterns to inject into the spatial pattern sequence may include: computing a histogram of intensity values of the modulated light stream, where the intensity values correspond respectively to the current spatial patterns; and selecting search survivors at the current depth level k from the child subsets. The search survivors at the current depth level k may correspond to the top P(k) percent of the intensity values in the histogram, where P(k) is a positive threshold value. The same process of injecting current spatial patterns, computing a histogram and selecting search survivors may be repeated for successively increasing levels of depth k until a desired depth level is reached.

In one set of embodiments, a system for identifying or classifying the spectrum of an incident light stream may include a digital micromirror device (DMD), a spectral sensing device (such as a spectrometer), a light sensing device (such as a photodiode) and a processing unit. The DMD may be configured to modulate the incident light stream.

The DMD includes an array of mirrors each configured to controllably switch between a first orientation state and a second orientation state. The DMD has two optical output paths for reflected light. The two optical output paths correspond respectively to the first and second orientations states. In other words, portions of the incident light stream impinging at any given time on mirrors in the first orientation state are reflected onto a first optical output path. Portions of the incident light stream impinging at any given time on mirrors in the second orientation state are reflected onto a second optical output path.

The light sensing device may be configured to receive light reflected onto the first optical path by the DMD. The spectral sensing device may be configured to receive light reflected onto the second optical output path by the DMD.

The processing unit may search the intensity field of the incident light stream to identify a spatial subset of the intensity field that at least partially contains one or more atypical regions within the intensity field. The action of searching the intensity field may include: (a) directing the DMD to modulate the incident light stream with a first sequence of spatial patterns so that the DMD outputs a first modulated light stream onto the first optical output path; (b) receiving samples of intensity of the first modulated light stream from the light sensing device, where each of the samples is captured by the light sensing device in response to the modulation of the incident light stream with a corresponding one of the spatial patterns of the first sequence; and (c) selecting current spatial patterns to be injected into the first sequence of spatial patterns based on an analysis of the samples corresponding to previous spatial patterns of the first sequence.

After having identified the spatial subset that at least partially contains the one or more atypical regions, the processing unit may direct the DMD to modulate the incident light stream with a restricted spatial pattern so that the DMD outputs a restricted light stream onto the second optical output path. The restricted spatial pattern corresponds to the spatial subset. In other words, the restricted spatial pattern is configured so that only the mirrors corresponding to the interior of the spatial subset are set to the second orientation state. Thus, portions of the incident light stream corresponding to the interior of the spatial subset are allowed to become part of the restricted light stream while portions of the incident light stream corresponding to the exterior of the spatial subset are excluded.

The processing unit may execute a spectral classification algorithm on a wavelength spectrum (of the restricted light stream) measured by the spectral sensing device in response to the modulation of the incident light stream with the restricted spatial pattern. The action of executing the classification algorithm classifies the wavelength spectrum into one of a plurality of classes (e.g., classes corresponding to chemical plume species or groups of chemical plume species).

If the class into which the wavelength spectrum has been classified is a class of interest to the user, the processing unit may perform a refined search to identify a refined spatial subset that more accurately contains the one or more atypical regions within the intensity field. Furthermore, the processing unit may repeat the classification process (or perform a refined classification process) using the refined spatial subset to modulate the incident light stream.

Various additional embodiments are described in U.S. Provisional Application No. 61/541,582 filed on Sep. 30, 2011, entitled "Adaptive Imaging Architecture and Algorithms for Hyperspectral Image-based Classification for Chemical Plume Analysis".

BRIEF DESCRIPTION OF THE DRAWINGS

A better understanding of the present invention can be obtained when the following detailed description of the preferred embodiments is considered in conjunction with the following drawings.

FIG. 15 illustrates one embodiment of a tree-based method for searching an incident light field for features of interest, where the search involves computing a histogram at each level of depth.

FIG. 16 illustrates an example of a quadtree that has been elaborated based on a collection of point signals.

Figure 1:
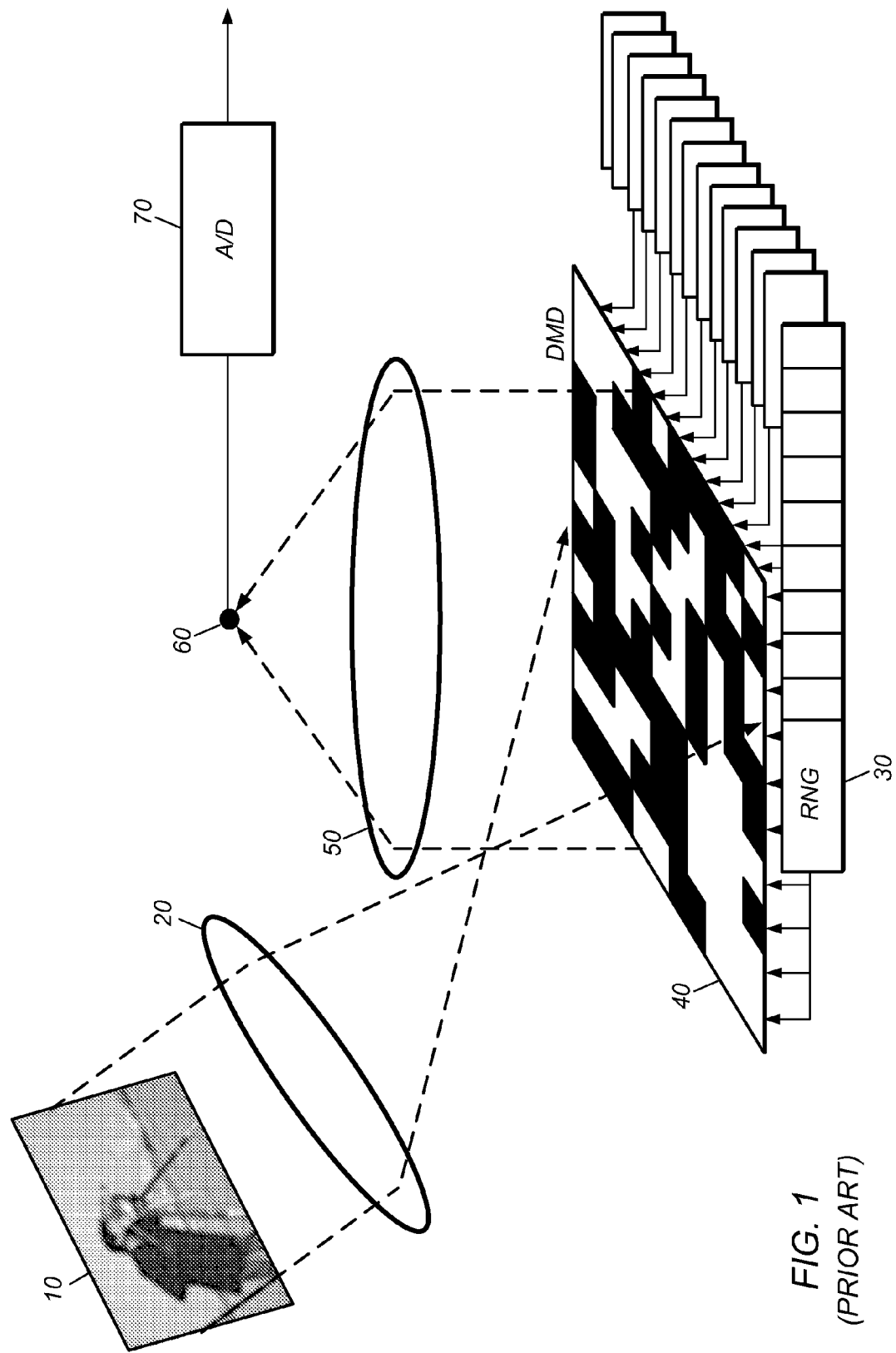
FIG. 1 illustrates a compressive sensing camera according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), tablet computers, computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

Figure 2A:
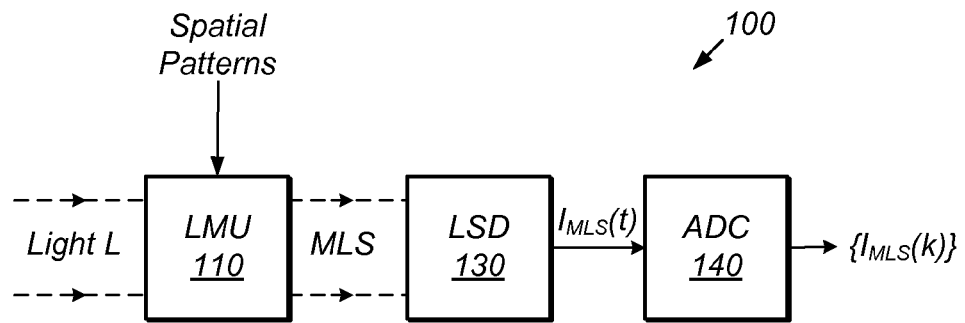
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

A system 100 for operating on light may be configured as shown in FIG. 2A. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements.

Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$ to obtain a time slice of the modulated light stream: $(m_{ij})*(x_{ij})=(m_{ij}*x_{ij})$. The vector $(m_{ij})$ is specified by the spatial pattern. Each light modulating element effectively scales (multiplies) the intensity of its corresponding light stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then immediately retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

Let N denote the number of light modulating elements in the light modulation unit 110. In various embodiments, the number N may take a wide variety of values. For example, in different sets of embodiments, N may be, respectively, in the range [64, 256], in the range [256, 1024], in the range [1024, 4096], in the range $[2^{12}, 2^{14}]$, in the range $[2^{14}, 2^{16}]$, in the range $[2^{16}, 2^{18}]$, in the range $[2^{18}, 2^{20}]$, in the range $[2^{20}, 2^{22}]$, in the range $[2^{22}, 2^{24}]$, in the range $[2^{24}, 2^{26}]$, in the range from $2^{26}$ to infinity. The particular value used in any given embodiment may depend on one or more factors specific to the embodiment.

The light sensing device 130 may be configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

In some embodiments, the light sensing device 130 includes one or more amplifiers (e.g., transimpedance amplifiers) to amplify the analog electrical signals generated by the one or more light sensing elements.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or an image sequence) and may be used to reconstruct the image (or image sequence) based on any reconstruction algorithm known in the field of compressive sensing. For reconstruction of an image sequence, the samples may be partitioned into contiguous subsets, and then the subsets may be processed to reconstruct corresponding images.

In some embodiments, the samples $\{I_{MLS}(k)\}$ may be used for some purpose other than, or in addition to, image (or image sequence) reconstruction. For example, system 100 (or some other system) may operate on the samples $\{I_{MLS}(k)\}$ to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$ (or parameters derived from that sample set) being similar to one of a collection of stored sample sets (or parameter sets).

In some embodiments, the light sensing device 130 includes exactly one light sensing element. (For example, the single light sensing element may be a photodiode.) The light sensing element may couple to an amplifier (e.g., a TIA) (e.g., a multi-stage amplifier).

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by the ADC 140 to obtain the sequence of samples $\{I_{MLS}(k)\}$. In another embodiment, the analog electrical signals may be individually digitized, each with its own ADC, to obtain corresponding sample sequences. The sample sequences may then be added to obtain the sequence $\{I_{MLS}(k)\}$. In another embodiment, the analog electrical signals produced by the light sensing elements may be sampled by a smaller number of ADCs than light sensing elements through the use of time multiplexing. For example, in one embodiment, system 100 may be configured to sample two or more of the analog electrical signals by switching the input of an ADC among the outputs of the two or more corresponding light sensing elements at a sufficiently high rate.

In some embodiments, the light sensing device 130 may include an array of light sensing elements. Arrays of any of a wide variety of sizes, configurations and material technologies are contemplated. In one embodiment, the light sensing device 130 includes a focal plane array coupled to a readout integrated circuit. In one embodiment, the light sensing device 130 may include an array of cells, where each cell includes a corresponding light sensing element and is configured to integrate and hold photo-induced charge created by the light sensing element, and to convert the integrated charge into a corresponding cell voltage. The light sensing device may also include (or couple to) circuitry configured to sample the cell voltages using one or more ADCs.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing device 130 may include a bi-cell photodiode. As yet another example, the light sensing device 130 may include a focal plane array.) Each light sensing element generates a corresponding signal representing intensity of the corresponding spatial portion as a function of time. Each signal may be digitized (e.g., by a corresponding ADC, or perhaps by a shared ADC) to obtain a corresponding sequence of samples. Thus, a plurality of sample sequences are obtained, one sample sequence per light sensing element. Each sample sequence may be processed to reconstruct a corresponding subimage. The subimages may be joined together to form a whole image. The sample sequences may be captured in response to the modulation of the incident light stream with a sequence of M spatial patterns, e.g., as variously described above. By employing any of various reconstruction algorithms known in the field of compressive sensing, the number of pixels in each reconstructed subimage may be greater than (e.g., much greater than) M. To reconstruct each subimage, the reconstruction algorithm uses the corresponding sample sequence and the restriction of the spatial patterns to the corresponding sub-region of the array of light modulating elements.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity interested in producing any of these embodiments may afford to spend more per light sensing element to realize features that are beyond the capabilities of modern array-based image sensors of large pixel count, e.g., features such as higher sensitivity, extended range of sensitivity, new range(s) of sensitivity, extended dynamic range, higher bandwidth/lower response time. Furthermore, because the light sensing device includes a small number of light sensing elements, an entity interested in producing any of these embodiments may use newer light sensing technologies (e.g., based on new materials or combinations of materials) that are not yet mature enough to be manufactured into focal plane arrays (FPA) with large pixel count. For example, new detector materials such as super-lattices, quantum dots, carbon nanotubes and graphene can significantly enhance the performance of IR detectors by reducing detector noise, increasing sensitivity, and/or decreasing detector cooling requirements.

In embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[\lambda_L, \lambda_U]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In one embodiment, the light sensing device 130 may include one or more photomultiplier tubes (PMTs).

In some embodiments, a filter may be placed in front of the light sensing device 130 to restrict the modulated light stream to a specific range of wavelengths or specific polarization. Thus, the signal $I_{MLS}(t)$ generated by the light sensing device 130 may be representative of the intensity of the restricted light stream. For example, by using a filter that passes only IR light, the light sensing device may be effectively converted into an IR detector. The sample principle may be applied to effectively convert the light sensing device into a detector for red or blue or green or UV or any desired wavelength band, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the ADC 140 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

In some embodiments, the system 100 may include a memory (or a set of memories of one or more kinds).

Figure 2B:
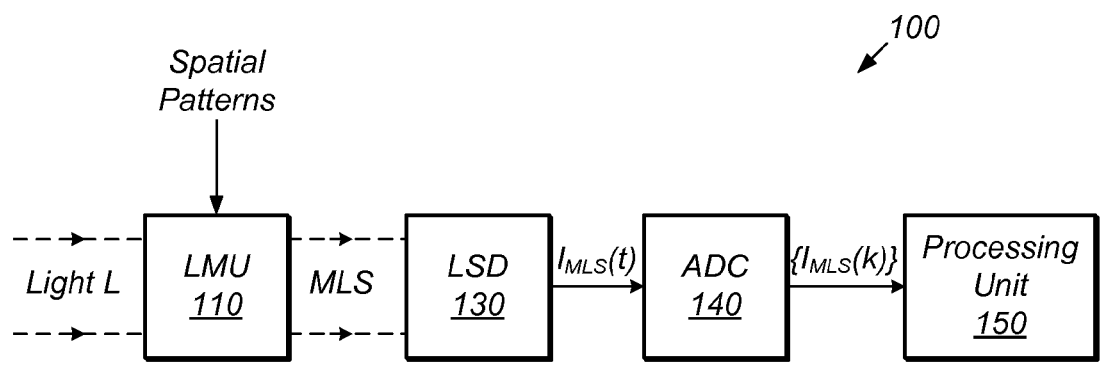
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be realized by one or more microprocessors, by one or more programmable hardware elements such as field-programmable gate arrays (FPGAs), by dedicated digital circuitry such as one or more application-specific integrated circuits (ASICs), or by any combination the foregoing. The processing unit 150 may be configured to perform one or more functions such as image reconstruction, system control, user interface, statistical analysis, and one or more inferences tasks.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image or video sequence. In this embodiment, the processing unit 150 may include a microprocessor configured to execute software (i.e., program instructions), especially software for performing an image/video reconstruction algorithm. In one embodiment, system 100 is configured to transmit the samples {$I_{MLS}$(k)} to some other system through a communication channel. (In embodiments where the spatial patterns are randomly-generated, system 100 may also transmit the random seed(s) used to generate the spatial patterns.) That other system may operate on the samples to reconstruct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image/video reconstruction. System 100 may allow a user to choose a desired algorithm and/or a desired transformation for performing the image/video reconstruction.

In some embodiments, the system 100 is configured to acquire a set $Z_M$ of samples from the ADC 140 so that the sample set $Z_M$ corresponds to M of the spatial patterns applied to the light modulation unit 110, where M is a positive integer. The number M is selected so that the sample set $Z_M$ is useable to reconstruct an n-pixel image or n-voxel video sequence that represents the incident light stream, where n is a positive integer less than or equal to the number N of light modulating elements in the light modulation unit 110. System 100 may be configured so that the number M is smaller than n. Thus, system 100 may operate as a compressive sensing device. (The number of "voxels" in a video sequence is the number of images in the video sequence times the number of pixels per image, or equivalently, the sum of the pixel counts of the images in the video sequence.)

In various embodiments, the compression ratio M/n may take any of a wide variety of values. For example, in different sets of embodiments, M/n may be, respectively, in the range [0.9, 0.8], in the range [0.8, 0.7], in the range [0.7, 0.6], in the range [0.6, 0.5], in the range [0.5, 0.4], in the range [0.4, 0.3], in the range [0.3, 0.2], in the range [0.2, 0.1], in the range [0.1, 0.05], in the range [0.05, 0.01], in the range [0.001, 0.01].

Superpixels for Modulation at Lower Spatial Resolution

As noted above, the image reconstructed from the sample subset $Z_M$ may be an n-pixel image with n≤N. The spatial patterns may be designed to support a value of n less than N, e.g., by forcing the array of light modulating elements to operate at a lower effective resolution than the physical resolution N. For example, the spatial patterns may be designed to force each 2×2 cell of light modulating elements to act in unison. At any given time, the modulation state of the four elements in a 2×2 cell will agree. Thus, the effective resolution of the array of light modulating elements is reduced to N/4. This principle generalizes to any cell size, to cells of any shape, and to collections of cells with non-uniform cell size and/or cell shape. For example, a collection of cells of size $k_H \times k_V$, where $k_H$ and $k_V$ are positive integers, would give an effective resolution equal to $N/(k_H k_V)$. In one alternative embodiment, cells near the center of the array may have smaller sizes than cells near the periphery of the array.

The "cells" of the above discussion are referred to herein as "superpixels". When the reconstruction algorithm generates an image (video frame) from the acquired sample data, each superpixel corresponds to one pixel in the reconstructed image (video frame).

Restricting the Spatial Patterns to a Subset of the Modulation Array

Another way the spatial patterns may be arranged to support the reconstruction of an n-pixel image with n less than N is to allow the spatial patterns to vary only within a subset (or region) of the array of light modulating elements. In this mode of operation, the spatial patterns are null (take the value zero) outside the subset. (Control unit 120 may be configured to implement this restriction of the spatial patterns.) Light modulating elements corresponding to positions outside of the subset do not send any light (or send only the minimum amount of light attainable) to the light sensing device. Thus, the reconstructed image is restricted to the subset. In some embodiments, each spatial pattern (e.g., of a measurement pattern sequence) may be multiplied element-wise by a binary mask that takes the one value only in the allowed subset, and the resulting product pattern may be supplied to the light modulation unit. In some embodiments, the subset is a contiguous region of the array of light modulating elements, e.g., a rectangle or a circular disk or a hexagon. In some embodiments, the size and/or position of the region may vary (e.g., dynamically). The position of the region may vary in order to track a moving object. The size of the region may vary in order to dynamically control the rate of image acquisition or video frame rate. In some embodiments, the size of the region may be determined by user input. For example, system 100 may provide an input interface (GUI and/or mechanical control device) through which the user may vary the size of the region over a continuous range of values (or alternatively, a discrete set of values), thereby implementing a digital zoom function. Furthermore, in some embodiments, the position of the region within the field of view may be controlled by user input.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the received modulated light beam.

In one embodiment, system 100 may be configured as a low-cost sensor system having minimal processing resources, e.g., processing resources insufficient to perform image (or video) reconstruction in user-acceptable time. In this embodiment, the system 100 may store and/or transmit the samples {$I_{MLS}$(k)} so that another agent, more plentifully endowed with processing resources, may perform the image/video reconstruction based on the samples.

Figure 2C:
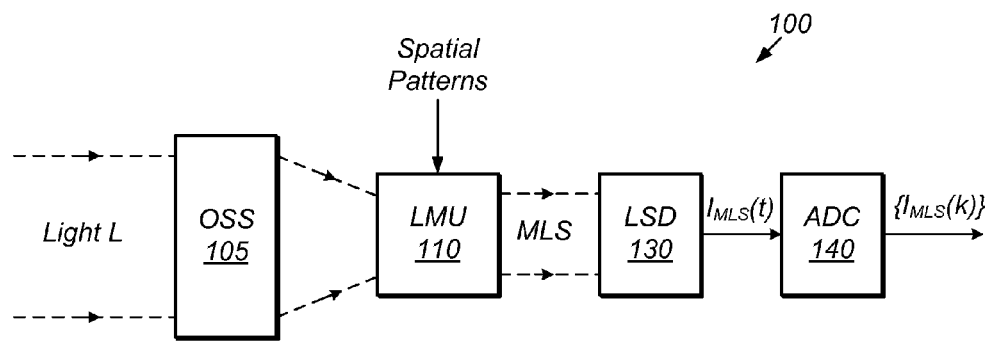
FIG. 2C illustrates an embodiment of system 100 that includes an optical subsystem (OSS) 105 to focus received light L onto the light modulation unit 110.
Figure 2D:
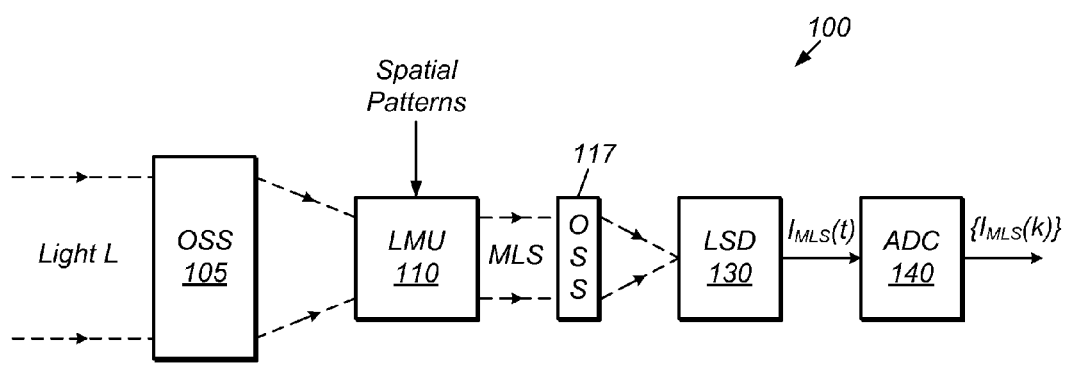
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured. The optical subsystem 105 may allow manual and/or software control of one or more parameters such as focus, zoom, shutter speed and f-stop.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot); points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense at any given time the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
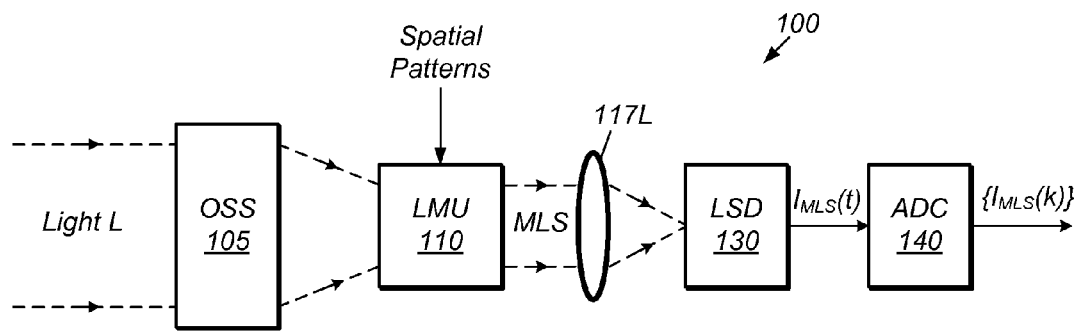
FIG. 2E illustrates an embodiment where the optical subsystem 117 is realized by a lens 117L.

In some embodiments, the optical subsystem 117 may include one or more lenses. FIG. 2E shows an embodiment where optical subsystem 117 is realized by a lens 117L, e.g., a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured from each light sensing device may be used to reconstruct a corresponding image (or video sequence) for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel multi-spectral imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the modulated light stream may experience two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a mechanism including one or more beam splitters) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, where each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured from each light sensing device may be used to reconstruct a corresponding image (or video sequence) for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition. In another similar embodiment, five streams are generated, filtered with five respective filters, and then measured with five respective light sensing devices to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. Samples captured from each light sensing device may be used to reconstruct a corresponding image (or video sequence) for the corresponding wavelength range.

Figure 2F:
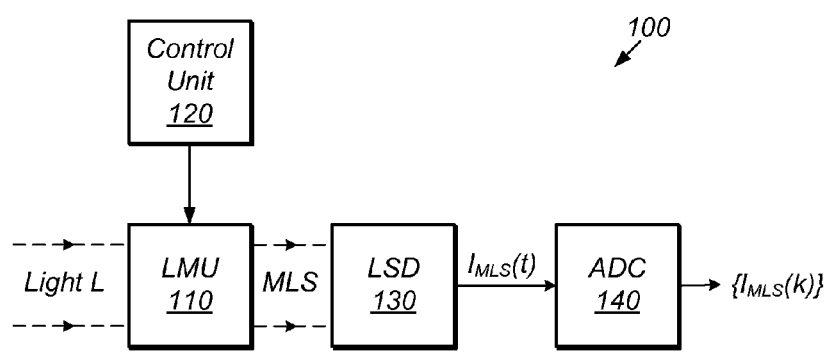
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the ADC 140 may be controlled by a common clock signal so that ADC 140 can coordinate (synchronize) its action of capturing the samples $\{I_{MLS}(k)\}$ with the control unit's action of supplying spatial patterns to the light modulation unit 110. (System 100 may include clock generation circuitry.)

In some embodiments, the control unit 120 may supply the spatial patterns to the light modulation unit in a periodic fashion.

The control unit 120 may be a digital circuit or a combination of digital circuits. For example, the control unit may include a microprocessor (or system of interconnected microprocessors), a programmable hardware element such as a field-programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying reconstructed images/videos.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

Coherence

The spatial patterns may belong to a set of measurement vectors that is incoherent with a set of vectors in which the image/video is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors A=$\{a_i\}$ and B=$\{b_i\}$ in the same N-dimensional space, A and B are said to be incoherent if their coherence measure $\mu(A,B)$ is sufficiently small. Assuming the vectors $\{a_i\}$ and the vectors $\{b_j\}$ have unit $L^2$ norm, the coherence measure may be defined as:

$$\mu(A, B) = \max_{i,j} |\langle a_i, b_j \rangle|.$$

The number of compressive sensing measurements (i.e., samples of the sequence $\{I_{MLS}(k)\}$ needed to reconstruct an N-pixel image (or N-voxel video sequence) that accurately represents the scene being captured is a strictly increasing function of the coherence between the measurement vector set and the sparsity vector set. Thus, better compression can be achieved with smaller values of the coherence. (The measurement vector set may also be referred to herein as the "measurement pattern set". Likewise, the sparsity vector set may also be referred to herein as the "sparsity pattern set".)

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a permuted basis such as a permuted DCT basis or a permuted Walsh-Hadamard basis, etc. (DCT is an acronym for Discrete Cosine Transform.)

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1–p of giving the value zero. (For example, in one embodiment p=½.) In some embodiments, the elements of each pattern are generated by a series of draws from a Gaussian random variable.)

The system 100 may be configured to operate in a compressive fashion, where the number of the samples $\{I_{MLS}(k)\}$ captured by the system 100 is less than (e.g., much less than) the number of pixels in the image (or video) to be reconstructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different application domains, e.g., domains such as visible light photography, infrared photography, ultraviolet photography, high-speed photography, low-light photography, underwater photography, multi-spectral imaging, hyperspectral imaging, etc. In some embodiments, system 100 is configured to operate in conjunction with (or as part of) another system, e.g., in conjunction with (or as part of) a microscope, a telescope, a robot, a security system, a surveillance system, a fire sensor, a node in a distributed sensor network, etc.

In some embodiments, system 100 is configured as a spectrometer.

In some embodiments, system 100 is configured as a multi-spectral or hyper-spectral imager.

In some embodiments, system 100 may be configured as a single integrated package, e.g., as a camera.

In some embodiments, system 100 may also be configured to operate as a projector. Thus, system 100 may include a light source, e.g., a light source located at or near a focal point of optical subsystem 117. In projection mode, the light modulation unit 110 may be supplied with an image (or a sequence of images), e.g., by control unit 120. The light modulation unit may receive a light beam generated by the light source, and modulate the light beam with the image (or sequence of images) to obtain a modulated light beam. The modulated light beam exits the system 100 and is displayed on a display surface (e.g., an external screen).

In one embodiment, the light modulation unit 110 may receive the light beam from the light source and modulate the light beam with a time sequence of spatial patterns (from a measurement pattern set). The resulting modulated light beam exits the system 100 and is used to illuminate the external scene. Light reflected from the external scene in response to the modulated light beam is measured by a light sensing device (e.g., a photodiode). The samples captured by the light sensing device comprise compressive measurements of external scene. Those compressive measurements may be used to reconstruct an image or video sequence as variously described above.

In some embodiments, system 100 includes an interface for communicating with a host computer. The host computer may send control information and/or program code to the system 100 via the interface. Furthermore, the host computer may receive status information and/or compressive sensing measurements from system 100 via the interface.

Figure 3A:
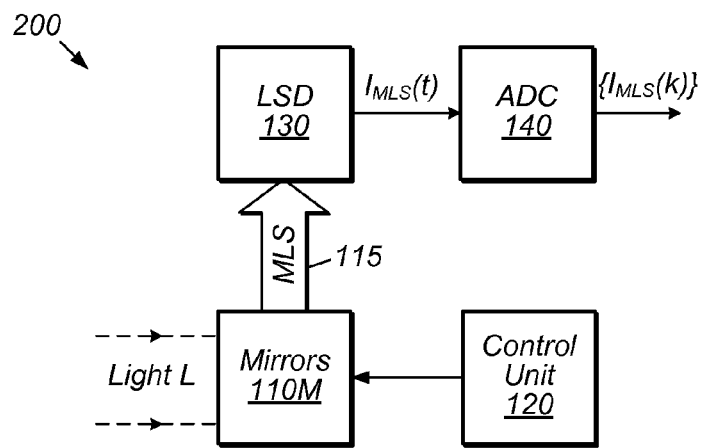
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between at least two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in different embodiments, the array may be a square array, a rectangular array, a hexagonal array, etc. In some embodiments, the mirrors are arranged in a spatially-random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal $I_{MLS}(t)$ representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

Figure 3B:
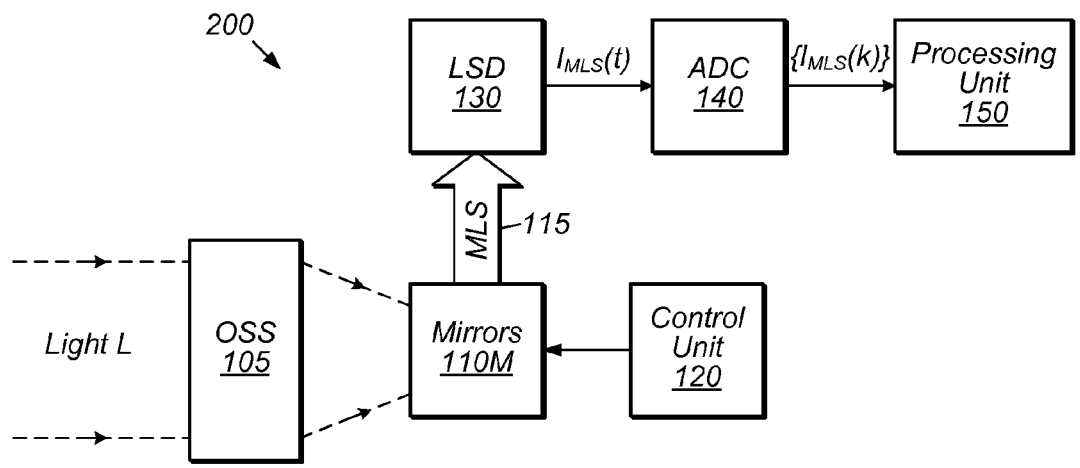
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
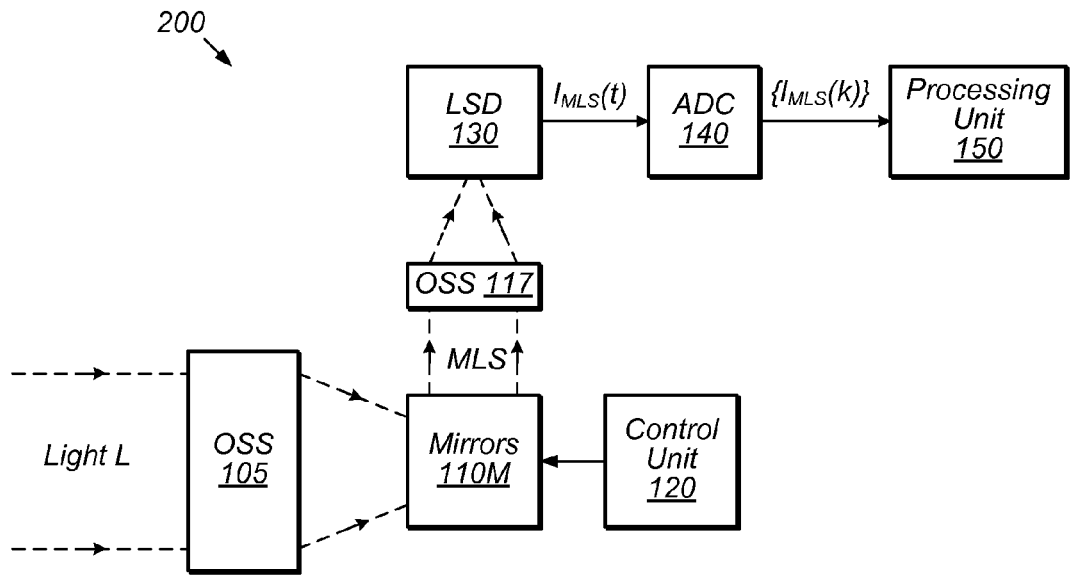
FIG. 4 shows an embodiment of system 200 that includes the optical subsystem 117 to direct or focus or concentrate the modulated light stream MLS onto the light sensing device 130.
Figure 5A:
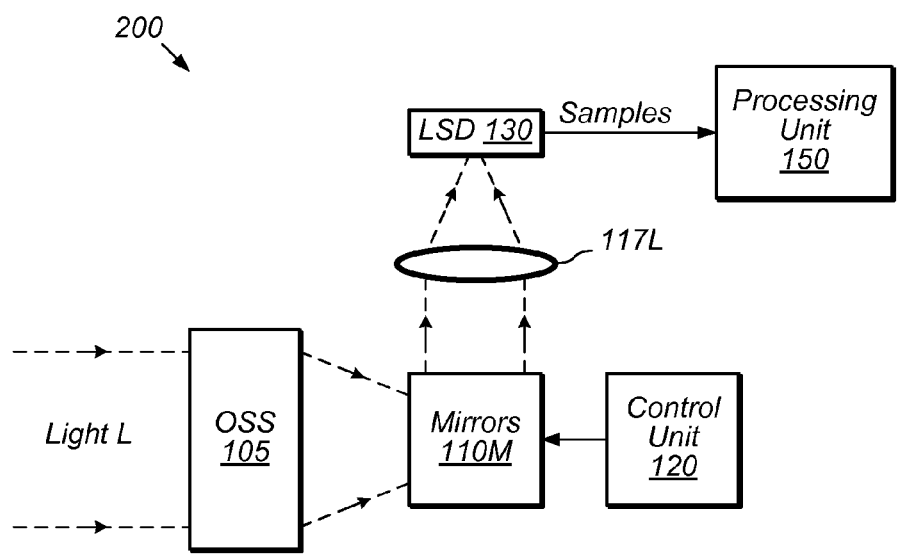
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens 117L, e.g., as shown in FIG. 5A.

Figure 5B:
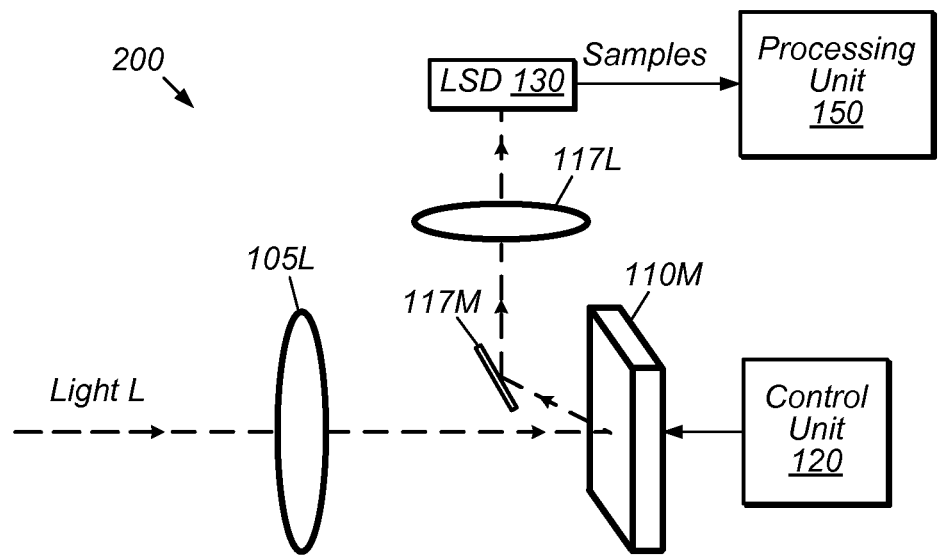
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
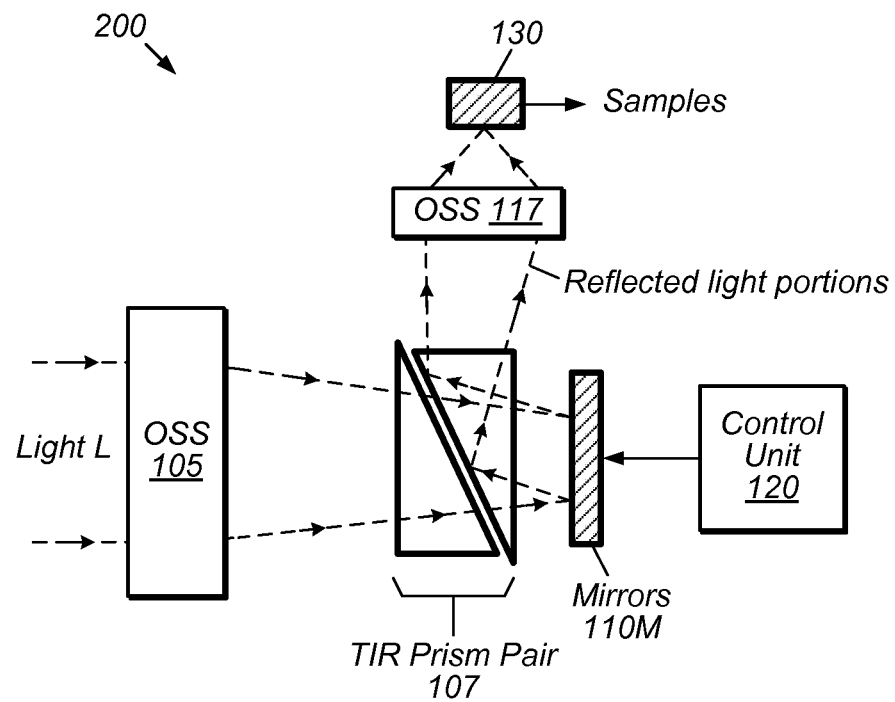
FIG. 5C shows another embodiment of system 200 that includes a TIR prism pair 107.

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".) Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

Spectral Sensing and Classification System

Figure 6:
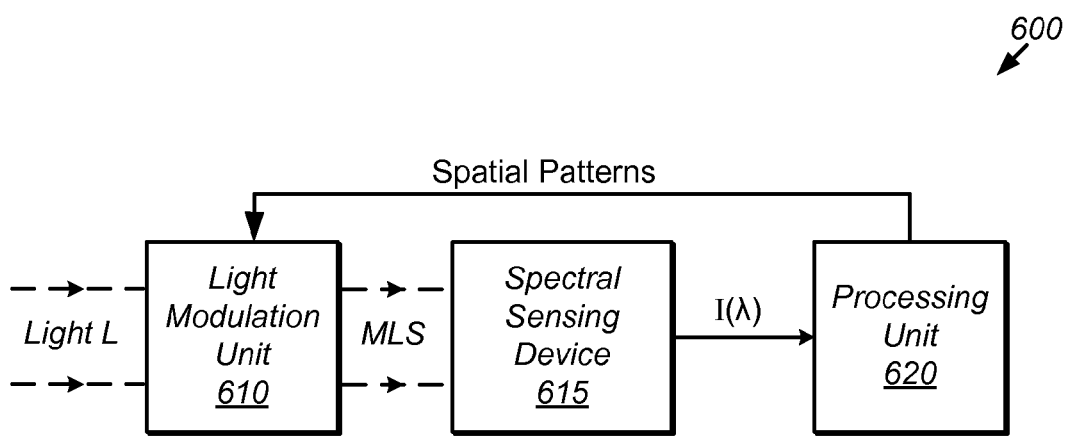
FIG. 6 illustrates one embodiment of a system configured to search an incident light field for one or more features of interest, and to measure and classify the wavelength spectra of the features of interest.

In one set of embodiments, a system 600 for classifying the wavelength spectrum of one or more atypical regions within an incident light stream may be configured as shown in FIG. 6. The system 600 may include a light modulation unit 610, a spectral sensing device 615 and a processing unit 620. (Furthermore, system 600 may include any subset of the features, elements and embodiments described above in connection with system 100 and system realization 200 and described below in connection with FIGS. 7-22.)

The light modulation unit 610 may be configured to modulate the incident light stream L to generate a modulated light stream MLS. The light modulation unit 610 includes an array of light modulating elements. The light modulation unit 610 may be configured as variously described above in connection with light modulation unit 110 and mirrors 110M. In one embodiment, the light modulation unit 610 is a digital micromirror device DMD.

The spectral sensing device 615 is configured to capture a wavelength spectrum $I(\lambda)$ or a temporal sequence $\{I_k(\lambda)\}$ of wavelength spectra of the modulated light stream MLS. The wavelength spectrum $I(\lambda)$ may cover a wavelength range of interest. Different wavelength ranges are contemplated in different embodiments. For example, in different embodiments, the wavelength range may be, respectively, the visible band, the IR band, the shortwave infrared (SWIR) band, the mediumwave infrared (MWIR) band, the longwave infrared (LWIR) band, the UV band, etc. (In some embodiments, the wavelength range may be programmable.) The wavelength spectrum $I(\lambda)$ may be outputted from the spectral sensing device in digital form, as a vector of intensity values (i.e., spectral components). Each of the intensity values represents the intensity of the modulated light stream over a corresponding interval of wavelengths within the wavelength range.

The spectral sensing device 615 may include a wavelength separating subsystem (e.g., using a grating and/or a prism) to separate the modulated light stream MLS into a continuous fan of wavelength components, and an array (e.g., a linear array) of light sensing elements such as photodiodes to measure corresponding portions of the continuous fan. In some embodiments, the spectral sensing device 615 may be spectrometer. Spectrometers are widely available from any of various manufacturers, and the principles of their design and construction are well understood in the field of optics.

The processing unit 620 may be realized by one or more processors (e.g., microprocessors or microprocessor cores) that are configured to execute stored program instructions, by dedicated digital circuitry such as one or more ASICs, by programmable hardware such as one or more FPGAs, or by any combination of the foregoing types of element. In some embodiments, processing unit 620 may be realized by processing unit 150, as variously described above.

The processing unit 620 may be configured to search an intensity field of the incident light stream to identify a spatial subset of the intensity field that at least partially contains one or more atypical regions within the intensity field. The one or more atypical regions may be distinguished from the remainder of the intensity field based on a difference in intensity, temperature, spectral pattern or shape, etc. For example, the atypical regions may be regions that are warmer (or alternatively, cooler) than the remainder of the intensity field. In other words, the one or more atypical regions may have a higher temperature than the average background temperature of the intensity field. In some embodiments, portions of the incident light stream within the one or more atypical regions may be spectrally distinct from portions of the incident light stream belonging to the exterior of the one or more atypical regions. For example, the atypical regions may be regions that have more energy in the infrared band (or in the UV band, or at one or more particular wavelengths) than the remainder of the intensity field.

The process of searching the intensity field may include: (a) directing the light modulation unit 610 to modulate the incident light stream with a first sequence of spatial patterns so that the light modulation unit produces a first modulated light stream; (b) receiving wavelength spectra $\{I_k(\lambda)\}$ of the first modulated light stream from the spectral sensing device 615, where each wavelength spectrum $I_k(\lambda)$ is measured by the spectral sensing device in response to the application of a corresponding one of the spatial patterns of the first sequence to the incident light stream; and (c) selecting current spatial patterns to be injected into the first sequence of spatial patterns based on an analysis of the wavelength spectra corresponding to previous spatial patterns of the first sequence.

After the processing unit 620 has identified the spatial subset that at least partially contains the one or more atypical regions, the processing unit may direct the light modulation unit 610 to modulate the incident light stream with a first restricted spatial pattern so the light modulation unit produces a first restricted light stream as output. The first restricted spatial pattern is restricted to the spatial subset. In other words, the first restricted spatial pattern is configured so that portions of the incident light stream inside the spatial subset are allowed to enter the first restricted light stream while portions of the incident light stream outside the spatial subset are prevented from entering the first restricted light stream. Thus, the restricted light stream may be representative of the one or more atypical regions.

The processing unit 620 may execute a spectral classification algorithm on a first restricted wavelength spectrum measured by the spectral sensing device in response to receiving the first restricted light stream. The action of executing the spectral classification algorithm classifies the first restricted wavelength spectrum into one of a plurality of classes. The processing unit may display the identified class to a user through a graphical user interface.

In one application, the classes may correspond to chemical plume species or groups of chemical plume species. In another application, the classes may correspond to the spectra generated by the explosion of various types of munitions. In yet another application, the classes may correspond to the spectra generated by the exhaust of various types of vehicles. In yet another application, the classes may correspond to the spectra generated by various types of objects of interest.

In some embodiments, the processing unit 620 may determine if the class into which the first restricted wavelength spectrum has been classified is a class of interest. (A subset of the classes may be pre-designated as classes of interest, e.g., by user selection.) In response to determining that said class is a class of interest, the processing unit may perform a refined search of the intensity field of the incident light stream to determine a refined spatial subset that more accurately contains the one or more atypical regions within the intensity field. The refined search may include: (1) directing the light modulation unit 610 to modulate the incident light stream with a second sequence of spatial patterns so that the light modulation unit produces a second modulated light stream; (2) receiving wavelength spectra of the second modulated light stream from the spectral sensing device, where each of the wavelength spectra of the second modulated light stream is measured by the spectral sensing device in response to the application of a corresponding one of the spatial patterns of the second sequence to the incident light stream; and (3) selecting current spatial patterns to be injected into the second sequence of spatial patterns based on an analysis of the wavelength spectra corresponding to previous spatial patterns of the second sequence.

After having identified the refined spatial subset, the processing unit may be configured to direct the light modulation unit to modulate the incident light stream with a second restricted spatial pattern to obtain a second restricted light stream. The second restricted spatial pattern is restricted to the refined spatial subset. In other words, portions of the incident light stream corresponding to the refined spatial subset are allowed to become part of the second restricted light stream while portions of the incident light stream outside the refined spatial subset are excluded. The processing unit may execute the spectral classification algorithm (or perhaps a refined classification algorithm) on a second restricted wavelength spectrum generated by the spectral sensing device in response to the second restricted light stream. The spectral classification algorithm classifies the second restricted wavelength spectrum relative to the plurality of classes (or perhaps, relative to a refined collection of classes).

In some embodiments, the second restricted spatial pattern may be applied by the light modulation unit (to the incident light stream) for a longer duration than a duration of application of the first restricted spatial pattern. Furthermore, the spectral sensing device may measure the second restricted wavelength spectrum for a longer period of time than the first restricted wavelength spectrum. In other words, the spectral sensing device may integrate the second restricted light stream for a longer period of time than the first restricted light stream. This longer integration time for the second restricted light stream implies that the second restricted wavelength spectrum represents a higher quality measurement (e.g., higher signal-to-noise ratio) than the first restricted wavelength spectrum.

In some embodiments, the action of searching of the intensity field includes a recursive search that is based on a tree of subsets of intensity field (i.e., a tree of subsets of the array of light modulating elements), where each of the search patterns is restricted to a corresponding one of the subsets. The size of the subsets is a decreasing function of depth level within the tree.

In some embodiments, the tree is a quad tree. For example, the tree of subsets may correspond to a recursive partitioning of the array of light modulating elements into rectangles.

In some embodiments, the one or more atypical regions may have a higher light intensity than an exterior of the one or more atypical regions. Furthermore, the action of searching the intensity field may be based on a tree of subsets of the array of light modulating elements. For a current depth level k of the tree, the above-described operation (a) may include injecting current spatial patterns into the first sequence of spatial patterns. The current spatial patterns may correspond to child subsets at the current depth level k whose parent subsets are search survivors at the previous depth level k−1. Furthermore, the above-described action (c) may include: computing a histogram of intensity values of the first modulated light stream, where the intensity values correspond respectively to the current spatial patterns; and selecting search survivors at the current depth level k from the child subsets, where the search survivors at the current depth level k correspond to the top P(k) percent of the intensity values in the histogram, where P(k) is a positive threshold value. This process of injecting current spatial patterns, computing a histogram and selecting search survivors may be repeated for successively increasing levels of depth k until a desired level of depth is reached.

Each of the intensity values of the first modulated light stream may be computed from the corresponding wavelength spectrum captured by the spectral sensing device. The intensity value of a wavelength spectrum may be computed, e.g., by summing the spectral components (or the square of the spectral components) of the wavelength spectrum. In one embodiment, the intensity value of a wavelength spectrum may be computed by combining a subset of the spectral components of the wavelength spectrum according to a predetermined function.

The threshold value P(k) may be a strictly decreasing function (or alternatively, a strictly increasing function) of depth level k.

In some embodiments, the processing unit 620 may be configured to direct the light modulation unit to modulate the incident light stream with a second sequence of spatial patterns to obtain a second modulated light stream, where each of the spatial patterns of the second sequence is configured so that portions of the incident light stream external to the identified spatial subset are prevented from entering into the second modulated light stream. Inside the identified spatial subset, the spatial patterns may be configured as compressive sensing (CS) measurement patterns. The processing unit may receive measurements of intensity of the second modulated light stream, where the intensity measurements correspond respectively to the spatial patterns of the second sequence. In other words, each of the intensity measurements represents the intensity of the second modulated light stream during the light modulation unit's action of modulating the incident light stream with the corresponding spatial pattern. In one embodiment, a light sensing device (such as a photodiode) is configured to sense the second modulated light stream, and the processing unit receives the intensity measurements from the light sensing device. In another embodiment, the second modulated light stream is received by the spectral sensing device. The spectral sensing device produces wavelength spectra in response to receiving the second modulated light stream. The processing unit receives the wavelength spectra and computes the intensity measurements from the respective wavelength spectra. The processing unit may store the intensity measurements of the second modulated light stream in a memory. The intensity measurements comprise a compressed representation of the intensity field over the interior of the spatial subset. The intensity measurements are usable to reconstruct an image representing the intensity field inside the identified spatial subset. The processing unit may itself perform the reconstruction and/or transfer the intensity measurements to a remote processing agent for remote reconstruction. The number of non-trivial image pixels (i.e., pixels in the image that correspond to the interior of the spatial subset) may be greater than the number of intensity measurements.

In some embodiments, the processing unit 620 may be configured to direct the light modulation unit to modulate the incident light stream with a second sequence of spatial patterns to obtain a second modulated light stream, where each of the spatial patterns of the second sequence is configured so that portions of the incident light stream external to the identified spatial subset are prevented from entering into the second modulated light stream. Inside the identified spatial subset, the spatial patterns may be configured as CS measurement patterns. The processing unit may receive wavelength spectra of the second modulated light stream, where the wavelength spectra are captured over time by the spectral sensing device in response to the light modulation unit's action of modulating the incident light stream with the second sequence of spatial patterns. (Each wavelength spectrum corresponds to a respective one of the spatial patterns.) The processing unit may store the wavelength spectra of the second modulated light stream in a memory. The wavelength spectra of the second modulated light stream are usable to reconstruct a plurality of images. (For example, if the wavelength spectra each have N spectral components, the processing unit may reconstruct N images, or fewer images if desired.) Each image represents the intensity field of the incident light stream over a corresponding interval of wavelengths and over the interior of the identified spatial subset. The number of non-trivial pixels in each image may be greater than the number of wavelength spectra used to perform the reconstruction.

Figure 7:
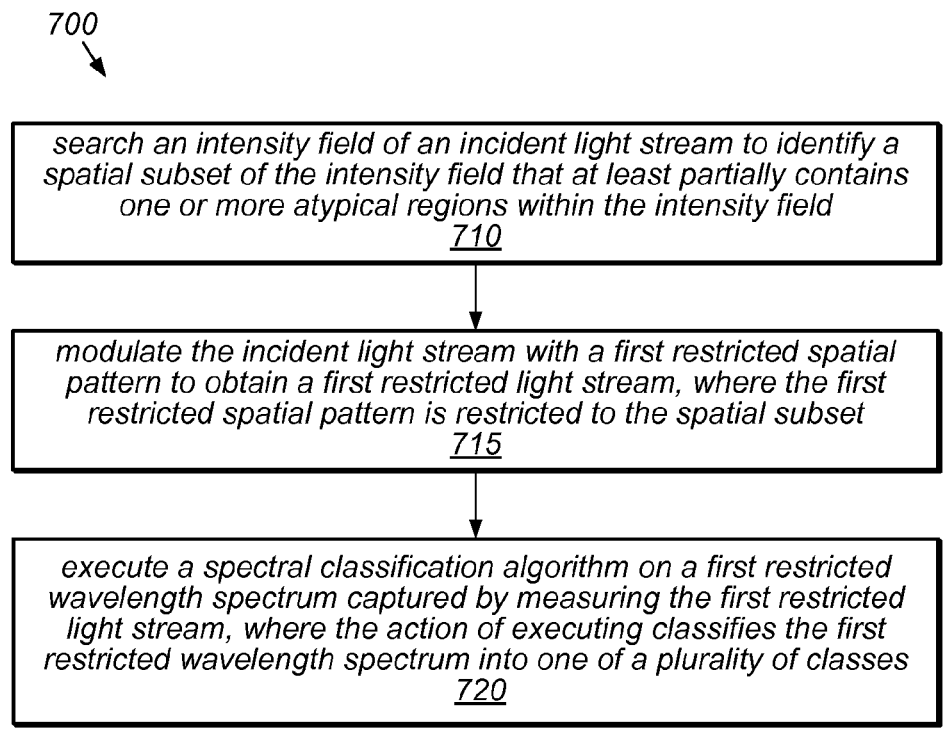
FIG. 7 illustrates one embodiment of a method for searching an incident light field to identify one or more features of interest, and for measuring and classifying the wavelength spectra of the features of interest.

In one set of embodiments, a method 700 for spectrally classifying one or more atypical regions (e.g., features of interest) within an incident light stream may involve the operations shown in FIG. 7. (The method 700 may also include any subset of the features, elements, and operations described above in connection with system 100, system realization 200 and system 600 and described below in connection with FIGS. 8-22.)

At 710, an intensity field of an incident light stream may be searched to identify a spatial subset of the intensity field that at least partially contains one or more atypical regions within the intensity field. The searching may include: (a) modulating the incident light stream with a sequence of spatial patterns to obtain a modulated light stream; (b) for each of the spatial patterns, measuring a corresponding wavelength spectrum of the modulated light stream (where each wavelength spectrum includes a plurality of spectral components corresponding to different wavelengths); and (c) selecting current spatial patterns to be injected into the sequence of spatial patterns based on an analysis of the wavelength spectra corresponding to previous spatial patterns of the modulation sequence.

At 715, the incident light stream may be modulated with a first restricted spatial pattern to obtain a first restricted light stream. The first restricted spatial pattern may be restricted to the spatial subset as variously described above.

At 720, a spectral classification algorithm may be executed on a first restricted wavelength spectrum captured by measuring the first restricted light stream. The execution of the spectral classification algorithm classifies the first restricted wavelength spectrum into one of a plurality of classes. See the above discussion of system 600 for various examples of the classes in different applications. In one embodiment, the classes correspond to chemical plume species or groups of chemical plume species.

In some embodiments, the one or more atypical regions have higher temperature than the average background temperature of the intensity field, in which case the process of analyzing the wavelength spectra may involve computing a temperature associated with each wavelength spectrum and analyzing the computed temperatures. In other embodiments, the one or more atypical regions are spectrally distinguished from the remainder of the intensity field. In other words, portions of the incident light stream within the one or more atypical regions are spectrally distinct from portions of the incident light stream belonging to the exterior of the one or more atypical regions. In this case, the process of analyzing the wavelength spectra may involve computing differences between the wavelength spectra of distinct spatial portions (e.g., neighboring portions) of the intensity field and analyzing the differences.

In some embodiments, the one or more atypical regions correspond to one or more chemical plumes.

In response to determining that the class into which the first restricted wavelength spectrum is classified is a class of interest, a refined search of the intensity field of the incident light stream may be performed to determine a refined spatial subset that more accurately contains the one or more atypical regions within the intensity field. The refined search may include: modulating the incident light stream with a refined sequence of spatial patterns to obtain a second modulated light stream; for each of the spatial patterns of the refined sequence, measuring a corresponding wavelength spectrum of the second modulated light stream; and selecting new spatial patterns to inject into the refined sequence of spatial patterns based on an analysis of the wavelength spectra corresponding to previous spatial patterns of the refined sequence.

The method 700 may also include: modulating the incident light stream with a second restricted spatial pattern to obtain a second restricted light stream, where the second restricted spatial pattern is restricted to the refined spatial subset; and executing the spectral classification algorithm (or a different spectral classification algorithm) on a second restricted wavelength spectrum captured by measuring the second restricted light stream. The action of executing the spectral classification algorithm on the second restricted wavelength spectrum classifies the second restricted wavelength spectrum relative to said plurality of classes (or perhaps, relative to a refined collection of classes). The time period of measurement of the second restricted wavelength spectrum may be longer than a time period of measurement of the first restricted wavelength spectrum.

In some embodiments, the search of the intensity field includes a recursive search that is based on a tree of subsets of the intensity field. Each of the spatial patterns is restricted to a corresponding one of the subsets of the intensity field. The size of the subsets is a decreasing function of depth level within the tree. The subsets may be polytopes such as rectangles and/or triangles.

In some embodiments, the tree of subsets is a quadtree corresponding to a recursive partitioning of the intensity field into rectangles.

In some embodiments, the search of the intensity field may include computing a total intensity (or energy or temperature) for each of the wavelength spectra measured as part of the measuring operation (b). See the above discussion of operation 710 in connection with FIG. 7. The "total intensity" of a wavelength spectrum may be determined by adding the spectral components (or the squares of the spectral components or a functional combination of the spectral components) of the wavelength spectrum. Furthermore, the search may include: computing a difference between the total intensity associated with a current subset of the tree and a mean intensity of other subsets (e.g., neighboring subsets) at one or more levels of the tree no deeper than the level of the current subset; comparing the difference to a threshold value; and exploring a subtree of the tree corresponding to the current subset in response to determining that the difference is greater than the threshold value.

In alternative embodiments, the search of the intensity field may include computing a test statistic for a current subset of the tree based on an RX anomaly detection algorithm. The RX anomaly detection algorithm is described in:

I. S. Reed and X. Yu, "Adaptive multiple-band CFAR detection of an optical pattern with unknown spectral distribution," *IEEE Trans. Acoustics, Speech and Signal Proc.*, vol. 38, pp. 1760-1770, October 1990 (hereinafter "Reed and Yu"), which is hereby incorporated by reference in its entirety as though fully and completely set forth herein. The test statistic may be computed based on the wavelength spectra corresponding to the current subset and to other subsets of the tree, e.g., as described below. The other subsets are at one or more levels of the tree no deeper than the level of the current subset. The search may involve comparing the test statistic to a threshold value, and exploring a subtree of the tree corresponding to the current subset in response to determining that the test statistic is greater than the threshold value.

In some embodiments, the method 700 may also include: modulating the incident light stream with a sequence of compressive sensing patterns to obtain a third modulated light stream; and for each of the compressive sensing patterns, measuring a corresponding wavelength spectrum of the third modulated light stream. The measured wavelength spectra may be used to algorithmically reconstruct a plurality of images. The $k^{th}$ image of the plurality of images may be reconstructed from the $k^{th}$ spectral component of each of the wavelength spectra.

In some embodiments, the method 700 may also include performing a search and measurement process a plurality of times in order to track movement of the one or more atypical regions, and/or, to track the appearance and disappearance of atypical regions. The search and measurement process includes the search 710, the modulation operation 715 and the execution 720.

In some embodiments, the method 700 may also include performing a morphological dilate-and-open transformation on the spatial subset prior to said modulating the incident light stream with a first restricted spatial pattern, e.g., as described below. (See, e.g., FIG. 20.)

Adaptive Imaging Architecture and Algorithms for Hyperspectral Image-Based Classification In this section, a system for hyperspectral imaging (HSI) data acquisition and processing is described. (Any subset of the features, elements and embodiments described above may be incorporated in any of the embodiments of this section. Furthermore, any subset of the features, elements and embodiments described in this section may be incorporated in any of the embodiments described above.) One goal of the system is to detect and classify anomalies in HSI data as efficiently as possible, which in this context we will take to mean as few measurements as possible. In some embodiments, our approach is based on the following two components: (1) an adaptive coarse-to-fine search using a digital micromirror device (DMD) based sensor, and (2) the subspace RX anomaly detector. Many other embodiments of the system are possible. One important application is the identification and quantification of chemical constituents in airborne plumes.

Imaging Architecture

Figure 8:
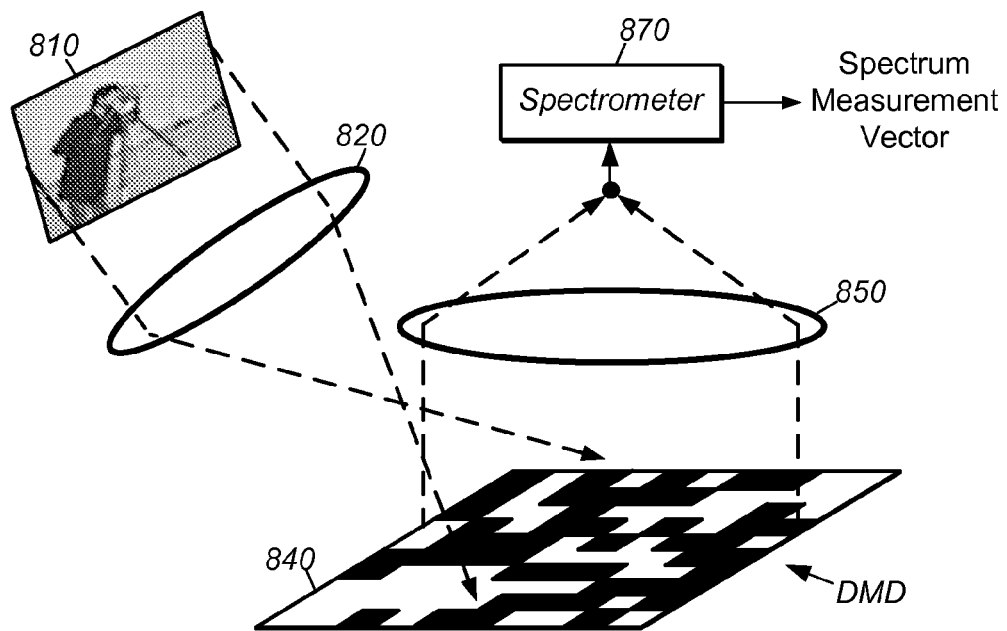
FIG. 8 illustrates one embodiment of a system for making spectral measurements using a digital micromirror device (DMD) as a mechanism for searching the incident light field.
Figure 9:
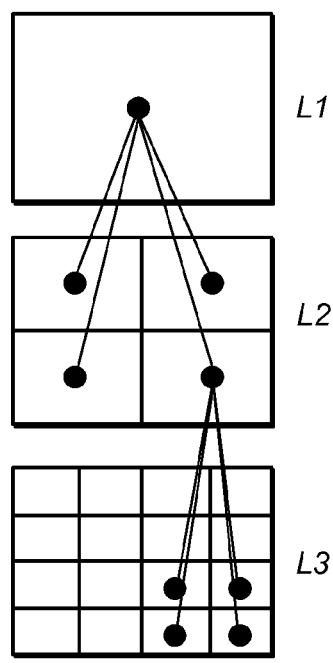
FIG. 9 illustrates one embodiment of a quadtree and the mapping of tree nodes to corresponding rectangular "superpixels" on the surface of the light modulation unit (e.g., DMD).

In some embodiments, we assume that the imaging architecture is based on the "single pixel" architecture illustrated in FIG. 8. Light from the scene 810 is focused via a lens 820 onto a programmable digital micromirror device (DMD). One of the two paths of output light from the DMD is focused using lens 850 onto a spectrometer 870 that computes a spectral measurement (i.e., a vector of intensities of the light at different wavelengths).

Notation $y_m$ is the spectrometer measurement vector m out of a total of M measurements. Denote each element as $y_m(w)$, where w=1, 2, ... W, and W is the number of wavelengths measured by the spectrometer.

x(i,j; w) is the frequency-dependent light intensity (scalar value) that arrives at pixel/mirror (i,j) of the DMD within the wavelength band w. Assume the DMD is N×N pixels (square, without loss of generality). x(i,j) will denote the vector of light intensities covering all W wavelengths. The 3D array of data x(i,j; w) for i=1, 2, ... N, j=1, 2, ... N, and w=1, 2, ... W is the HSI cube we seek to sense.

$a_m(i,j)$ is DMD mirror (i,j)'s response during measurement m (scalar value). When $a_m(i,j)$=1, all light from pixel (i,j), i.e., all of x(i,j; w), is reflected to the spectrometer through the second lens. When $a_m(i,j)$=0, no light is reflected.

A is an M×N$^2$ matrix formed by vectorizing the $a_m$ and stacking them as rows into a matrix.

With this notation, we can write the simple linear measurement system:

$$y_m(w) = \text{Sum}_{(i,j)}[a_m(i,j) * x(i,j;w)],$$

where Sum$_{(i,j)}$ is the usual "sigma" notation for a sum over i=1, 2, ..., N and j=1, 2, ... N, and "*" denotes multiplication.

In traditional compressive sensing (CS), the matrix A is "random" and independent of the scene x. In this work, the measurements comprising the matrix A will be chosen adaptively based on what we have already learned about the scene from previous measurements.

Phase 1: Adaptive Anomaly Detection Algorithm

Background on RX Algorithm

Given a 3D HSI data cube, the RX algorithm identifies potential anomalies by finding pixels whose spectral characteristics do not match those of the "background" [AD]. For more information on the RX algorithm, please see Reed and Yu. For more information on anomaly detection, please see "Anomaly Detection from Hyperspectral Imagery", D. Stein et al., IEEE Signal Processing Magazine, January 2002, which is hereby incorporated by reference in its entirety as though fully and completely set forth herein.

The RX approach proceeds as follows:

1. Given the HSI data cube x(i,j; w), estimate the spectral mean s and covariance matrix C by averaging over all pixels i and j. Many different mean and covariance estimates are possible; one example is:

$$s(w) = (1/N^2) \text{Sum}_{(i,j)}[x(i,j;w)]$$

$$C(r,c) = (1/(N^4-1)) \text{Sum}_{(i,j)}[\text{Sum}_{(a,b)}[(x(i,j;r)-s(r))(x(a,b;c)-s(c))]]$$

where C(r,c) is the scalar element of the covariance matrix C at row r and column c.

2. Compute the pixel-by-pixel test statistic $$L(i,j) = (x(i,j)-s)^T C^{-1} (x(i,j)-s).$$

3. Compare L(i,j) to a threshold t to detect anomalies:

(i,j) is an anomaly if L(i,j) > t.

Without loss of generality, the threshold t is assumed to be fixed.

Numerous extensions to the baseline RX algorithm are possible, including using the singular value decomposition (SVD) of the matrix C in order to suppress noise from the background. In some embodiments, the following extensions to the RX algorithm are contemplated: (1) use of the subspace RX algorithm, (2) estimation of the matrix C from a window of pixels around the pixel of interest, (3) use of space-varying anomaly thresholds. For information on the subspace RX algorithm, see A. V. Kanaev, E. Allman and J. Murray-Krezan, "Reduction of false alarms caused by background boundaries in real time subspace RX anomaly detection", Proc. SPIE 7334, 2009. For information on the estimation of the matrix C from a window of pixels around the pixel of interest, see H. Kwon, N. M. Nasrabadi, "Kernel RX-algorithm: A nonlinear anomaly detector for hyperspectral imagery," IEEE Trans. Geosci. Remote Sensing, 43(2): 388-397, 2005. The above-indicated articles are hereby incorporated by reference in their entireties as though fully and completely set forth herein.

Coarse-to-Fine Anomaly Detection Algorithm

RX and other anomaly detection algorithms require that we acquire the entire HSI data cube before searching for anomalies. This would require $N^2$ spectral measurements (or $N^2W$ scalar measurements in total) for our DMD-based HSI system. When (1) the anomalous pixels comprise a small fraction of the total number of image pixels ($N^2$) and (2) the anomalousness of the anomalies is significant enough, we can search for them using a method not unlike a coarse-to-fine binary search. Such a search will require us to take much fewer than $N^2$ total spectral measurements.

Our construct is that of a "super pixel" (SP that is simply the sum of the x(i,j) values over a region of pixel space. A SP measurement can be computed using the DMD-based camera simply by turning all the mirrors "on" inside the SP and all of the mirrors "off" outside the SP. In some embodiments, we will be especially interested in dyadic-sized superpixels that tessellate the image pixel space. See FIG. 9. Note that the set of all dyadic SPs forms a quad-tree. At level L1, the tree includes a single rectangle (node) covering the entire image. At level L2, there are four child rectangles that partition the single rectangle of level L1. At level L3, each of four child rectangles has four children. However, only one of the four rectangles at level L2 is elaborated to indicate that the search do not typically explore all branch of the tree to equal depth. The termination criteria will more typically be achieved at different depths for different branches.

There is a clear tradeoff associated with SP sensing. Larger SPs have the positive effect of increasing the SNR of the measurement, since we aggregate more light, but also the negative effect of mixing together spectra from different pixels. This latter effect is the reason why we assumed above that the anomalous pixels are sufficiently different from the background.

Algorithm 1: Coarse-to-Fine Anomaly Search

Algorithm Inputs:

(a) Image of N×N pixels with N equal to a power of 2.

(b) Starting (coarsest) refinement level Ks.

(c) Ending (finest) refinement level Ke.

Initialization of Anomalous SP indicator: ASP(i,j,k)=1 if SP(i,j) at scale k is detected as being anomalous. Initialize ASP(i,j,Ks−1)=1, i.e., the parents of all SPs at the starting (coarsest) scale are deemed anomalous so that first iteration of algorithm visits all coarsest-scale SPs.

For k=Ks, Ks−1, . . . , Ke Do

1. If the parent SP at the next coarsest scale has ASP(i,j,k−1)=1, then configure DMD mirrors to measure wavelength spectra of the corresponding SP of size $N/2^k \times N/2^k$ by turning all of the DMD mirrors off except for those corresponding to the SP.

2. Perform anomaly detection on each SP's spectrum according to the RX algorithm detailed above. In particular, estimate the spectral mean and covariance matrix from the other SP spectra at this scale. (This might require acquiring background.) Set ASP(i,j,k)=1 at anomalous pixels.

End

The output of Algorithm 1 is a collection of finest scale SPs that are likely to contain an anomaly.

The key to the adaptivity of Algorithm 1 is that we measure spectra at SPs only when their parent is deemed anomalous. This can be interpreted as growing a forest of quadtrees from the coarsest scale SPs.

Phase 2: Adapative Classification Algorithm

Once the candidate anomalies are detected, we again exploit the programmability of the DMD to characterize the spectrum of the anomalous SPs. In the plume characterization problem, this corresponds to plume classification. We will use the terms "anomaly" and "plume" interchangeably below.

We may analyze each potential plume independently in turn by turning "off" all of the DMD mirrors except those corresponding to pixels in the potential plume; we turn "on" all the mirrors within the potential plume. Now we receive at the focal point of the second lens (the spectrometer input) a single signal comprising the sum of all of the pixels in the candidate plume. If there are P pixels in the candidate plume, then this averaging process will increase the SNR by sqrt(P) times. After recording the spectral signature using the spectrometer, we can run any standard algorithm (SVM, PCA, etc.) for plume classification, spectral unmixing, etc. (SVM is an acronym for "Support Vector Machine". PCA is an acronym for "Principal Component Analysis".)

Once a plume has been determined to be "interesting," we can subject it to a much more detailed analysis by returning to Phase 1 to more carefully delineate its boundary by taking additional measurements over a longer time interval (which will improve the performance of the spectral unmixing algorithms in Phase 2) and returning to Phase 2 to stare at the plume for a longer time to improve the SNR for the spectral unmixing and spectral characterization. The ability to adapt in this way in order to "zoom" in on plumes and nearly perfectly reject the clutter background is an attractive feature of the DMD-based camera architecture.

Figure 10:
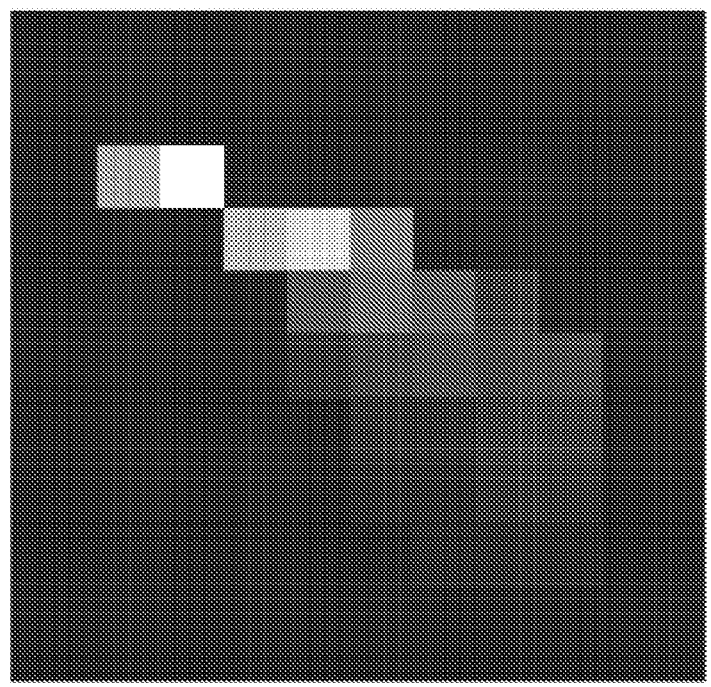
FIG. 10 illustrates the final result of the search according to one implementation. The plume is identified by a collection of pixels that have survived until the last stage.

Note that the ultimate output SP for plume classification can be irregular in shape. In FIG. 10, for example, the black pixels are non-plume pixels. The pixels within the plume are of various shades of gray.

Practical Issues and Enhancements

Bias/Variance Tradeoff with Scale

There is a clear bias/variance tradeoff with respect to the scale of the SPs. Coarse-scale SPs have smaller variance than fine-scale SPs, because they average together more pixels. However, the averaging also introduces bias due to contamination of the plume radiance by background radiance. Both bias and variance make it more difficult to detect and classify anomalies. Hence, it might be advantageous to use a smaller detection threshold at coarser scales.

Figure 11:
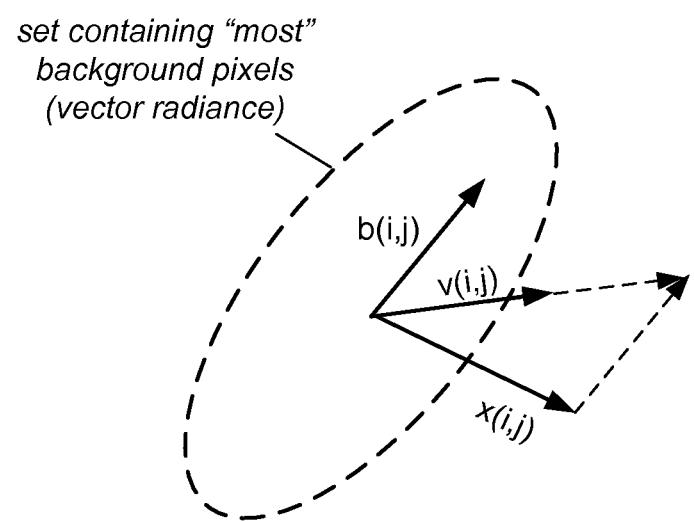
FIG. 11 illustrates an addition of radiance vectors associated with two-pixel superpixel comprising one background pixel and one foreground pixel.

We can visualize the bias/variance tradeoff using the detection ellipse of the RX anomaly detector. FIG. 11 depicts the simplified scenario of a two-pixel SP with one-half background pixels (i.e., one pixel) and one-half foreground pixels (i.e., one pixel). In this case, vector radiance x(i,j) of the anomalous pixel is summed with a background pixel radiance vector b(i,j). If we renormalize by dividing the length of the summed vector by two, we arrive at the radiance vector v(i,j) of the superpixel with ½ background pixels and ½ plume pixels. In general, since anomalous and background radiance vectors are not collinear (by definition), this summing and normalizing process will draw the SP radiance closer to the distribution of background pixels, making it harder to detect. Fortunately, though, as the SP size increases, the blue ellipse shrinks, which makes it easier to detect anomalous pixels.

We can optimize the bias/variance tradeoff by minimizing the total mean squared error (MSE):

$$MSE = Bias^2 + Variance^2$$

which includes the competing bias and variance terms.

Starting Scale

The entire scene may be scanned at the resolution of the coarsest SP; hence to reduce the total number of measurements it is advantageous to start at the coarsest-possible scale. However, it may be necessary to start at a fine enough scale so that the bias due to averaging does not obscure the very anomalies we seek.

Tracking Time-Varying Plumes

In some embodiments, the system may alternate between Phase 1 and Phase 2 over time in order to track the candidate plumes. The plumes themselves will also move due to convection and wind effects.

Since a plume is well modeled as a linear dynamical system, in some embodiments, the system may perform CS video recovery as described in:

A. C. Sankaranarayanan, P. K. Turaga, R. G. Baraniuk, and R. Chellappa, "Compressive acquisition of dynamic scenes", European Conference on Computer Vision, Heraklion, Crete, Greece, September, 2010, which is hereby incorporated by reference in its entirety as though fully and completely set forth herein.

Example

Figure 12:
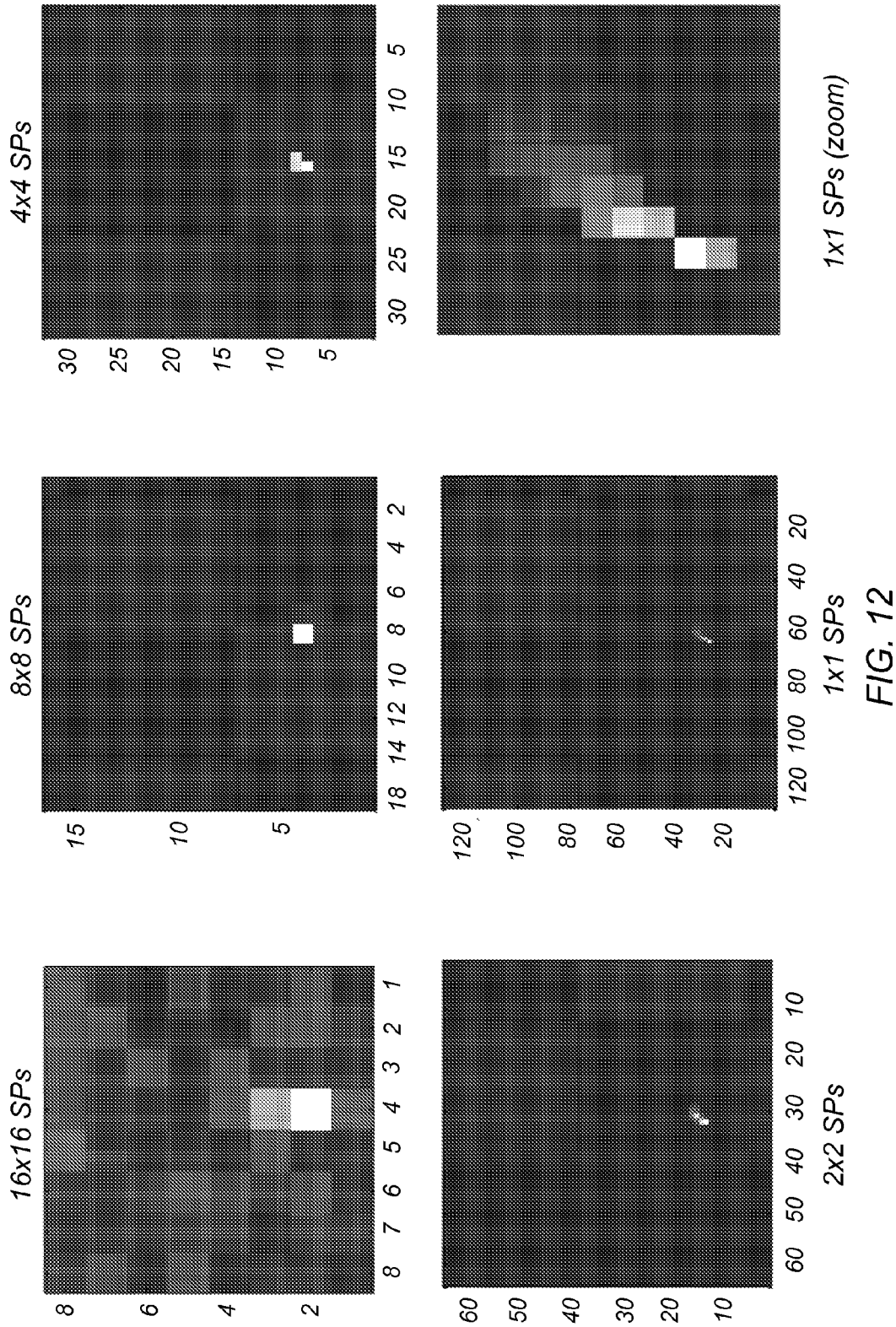
FIG. 12 illustrates successive stages in a search for a chemical plume. In the first stage, the superpixels are of size 16×16. In the last stage, the superpixels are of size 1×1.

As an example, we executed Algorithm 1 on a simulated 128×128 HSI data cube containing a chemical plume and additive noise. FIG. 12 plots the SP-based RX output for a range of SP sizes. (Each drawing corresponds to the same field of view except for the bottom-right drawing, which is a close-up of the neighborhood of the chemical plume. A total of 80 spectral measurements were required to detect and estimate the position of the plume, which corresponds to a 204:1 compression ratio.

System with Spectral Sensor and Light Sensor at DMD Output Ports

Figure 13:
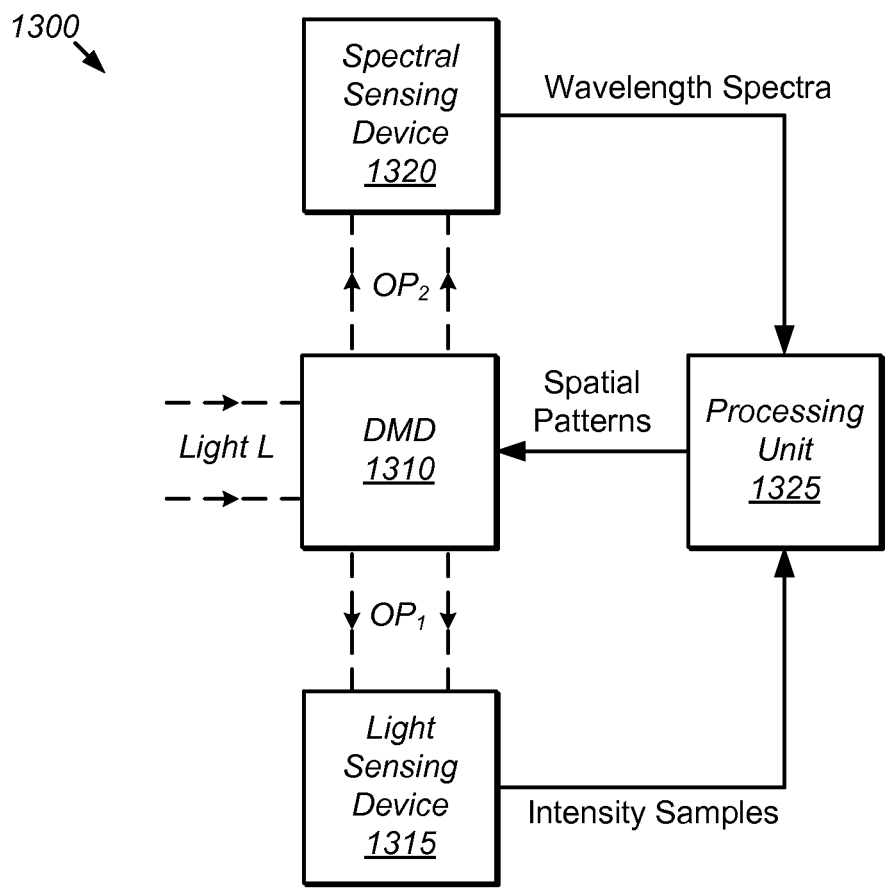
FIG. 13 illustrates one embodiment of a system for searching an incident light field for one or more atypical regions, and for making spectral measurements on the atypical regions. The system includes a digital micromirror device (DMD) with two output ports.

In one set of embodiments, a system 1300 for classifying the wavelength spectrum of one or atypical (or anomalous) regions within an incident light stream may be configured as shown in FIG. 13. The system 1300 may include a light modulation unit 1310, a light sensing device 1315 (such as a photodiode), a spectral sensing device 1320 (such as a spectrometer) and a processing unit 1325. (Furthermore, the system 1300 may include any subset of the features, elements and embodiments described above in connection with system 100, system realization 200, system 600, method 700, and in connection with FIGS. 8-12.

The digital micromirror device (DMD) 1310 may be configured to modulate an incident light stream L with spatial patterns, e.g., as described above in connection with light modulation unit 110 and mirrors 110M. The DMD includes an array of mirrors each configured to controllably switch between a first orientation state and a second orientation state. The DMD has two optical output paths $OP_1$ and $OP_2$ for reflected light. The two optical output paths correspond respectively to the first and second orientations states. In other words, portions of the incident light stream that impinge upon mirrors in the first orientation state are reflected onto the first output path $OP_1$ while portions of the incident light stream that impinge upon mirrors in the second orientation state are reflected onto the second output path $OP_2$. In some embodiments, the system 1300 may include a dual TIR prism to direct the light reflected by mirrors in the first orientation state onto the first output path $OP_1$ and to direct the light reflected by mirrors in the second orientation state onto the second output path $OP_2$, e.g., as described in connection with FIGS. 20 and 21 of U.S. patent application Ser. No. 13/207,900, filed on Aug. 11, 2011, entitled "TIR Prism to Separate Incident Light and Modulated Light in Compressive Imaging Device". That Patent Application is hereby incorporated by reference in its entirety as through fully and completely set forth herein.

In another embodiment, the system 1300 may include a pair of output mirrors to direct the light reflected by DMD mirrors in the first orientation state onto the first output path $OP_1$ and to direct the light reflected by DMD mirrors in the second orientation state onto the second output path $OP_2$, e.g., as shown in FIG. 11 of U.S. patent application Ser. No. 13/193, 553, filed on Jul. 28, 2011, entitled "Determining Light Level Variation in Compressive Imaging by Injecting Calibration Patterns into Pattern Sequence". That Patent Application is hereby incorporated by reference in its entirety as through fully and completely set forth herein.

The light sensing device 1315 may be configured to receive light reflected onto the first optical path $OP_1$ by the DMD. The light sensing device 1315 may be configured as variously described above in connection with light sensing device 130. The ADC 140 (see, e.g., FIG. 2A) may also be included in the light sensing device 1315.

The spectral sensing device 1320 may be configured to receive light reflected onto the second optical output path $OP_2$ by the DMD and to capture a wavelength spectrum in response to that received light. The spectral sensing device 1320 may be configured as variously described above in connection with spectral sensing device 615.

The processing unit 1325 may be configured to search an intensity field of the incident light stream L to identify a spatial subset of the intensity field that at least partially contains one or more atypical regions within the intensity field. The search of the intensity field may include: (a) directing the DMD 1310 to modulate the incident light stream with a first sequence of spatial patterns so that the DMD outputs a first modulated light stream onto the first optical output path $OP_1$; (b) receiving samples of intensity of the first modulated light stream from the light sensing device 1315, where each of the samples is captured by the light sensing device in response to the DMD's application of a corresponding one of the spatial patterns of the first sequence; and (c) selecting current spatial patterns to be injected into the first sequence of spatial patterns based on an analysis of the samples corresponding to previous spatial patterns of the first sequence.

After having identified the spatial subset that at least partially contains the one or more atypical regions, the processing unit 1325 may direct the DMD to modulate the incident light stream L with a first restricted spatial pattern so that the DMD outputs a first restricted light stream onto the second optical output path $OP_2$. The first restricted spatial pattern corresponds to the spatial subset. In other words, the first restricted spatial pattern is configured so that only the mirrors corresponding to the interior of the spatial subset are instructed to assume the second orientation state. Thus, only portions of the incident light stream interior to the spatial subset are reflected onto the second optical path $OP_2$ and sensed by the spectral sensing device 1320. The processing unit may then execute a spectral classification algorithm on a first restricted wavelength spectrum (of the first restricted light stream) measured by the spectral sensing device 1320 in response to the DMD's modulation of the incident light stream with the first restricted spatial pattern. The execution of the spectral classification algorithm classifies the first restricted wavelength spectrum into one of a plurality of classes (e.g., classes corresponding to chemical plume species or groups of chemical plume species).

In response to determining that the class into which the first restricted wavelength spectrum has been classified is a class of interest, the processing unit 1325 may perform a refined search of the intensity field of the incident light stream to determine a refined spatial subset that more accurately contains the one or more atypical regions within the intensity field. Furthermore, the processing unit 1325 may be configured to: direct the DMD to modulate the incident light stream with a second restricted spatial pattern, where the second restricted spatial pattern is configured so that only the mirrors corresponding to the interior of the refined spatial subset are set to the second orientation state; and execute the spectral classification algorithm (or perhaps a different spectral classification algorithm) on a second restricted wavelength spectrum measured by the spectral sensing device 1320 in response to the modulation of the incident light stream with the second restricted spatial pattern. The execution of the spectral classification algorithm classifies the second restricted wavelength spectrum relative to the above-described plurality of classes (or perhaps, relative to a refined collection of classes).

In some embodiments, the processing unit 1325 may be configured to direct the DMD so that the incident light stream is modulated with the second restricted spatial pattern over a longer duration than a duration over which the incident light stream was modulated with the first restricted spatial pattern.

In some embodiments, the search of the intensity field may include a recursive search that is based on a tree of subsets of the array of mirrors. Each of the spatial patterns of the first sequence may correspond to a unique one of the subsets of the tree. Each of the spatial patterns of the first sequence may be set to the first orientation state only within the corresponding subset. Thus, only portions of the incident light stream corresponding inside the subset are reflected onto the first optical path $OP_1$. The size of the subsets of the tree is a decreasing function of depth level within the tree. In some embodiments, the tree is a quadtree corresponding to a recursive partitioning of the array of mirrors into rectangles.

In some embodiments, the search of the intensity field includes: computing a difference between the sample associated with a current subset of the tree and a mean intensity of other subsets at one or more levels of the tree no deeper than the current subset; comparing the difference to a threshold value; and exploring the subtree of the tree corresponding to the current subset in response to determining that the difference satisfies a predetermined inequality relative to the threshold value.

Figure 14:
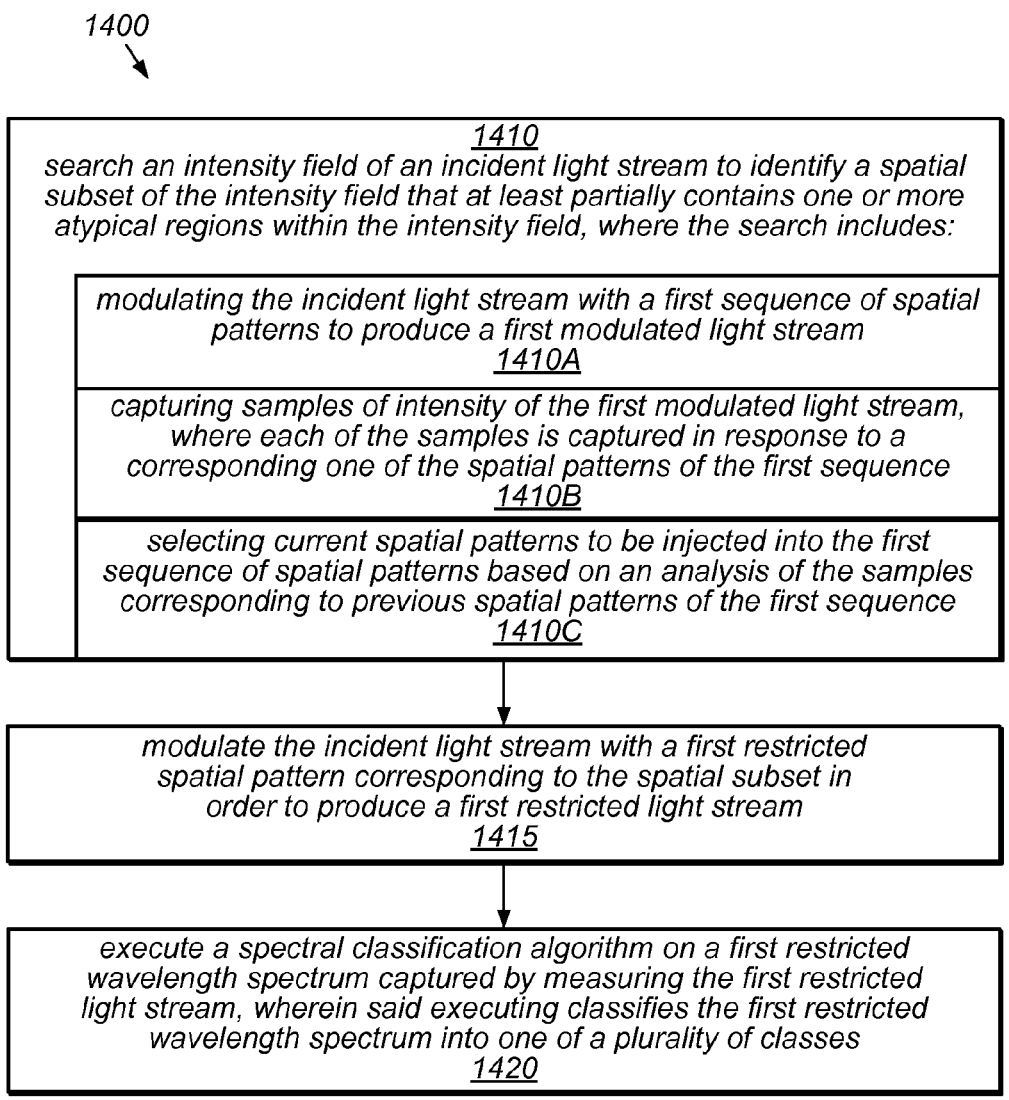
FIG. 14 illustrates one embodiment of a method for searching an incident light field for one or more atypical regions, and for making spectral measurements on the atypical regions.

In one set of embodiments, a method 1400 for classifying the wavelength spectrum of one or more atypical regions within an incident light field may involve the operations shown in FIG. 14. The method 1400 may also include any subset of the features, elements and embodiments described above in connection with system 100, system realization 200, system 600, method 700, system 1300 and FIGS. 1-13.

At 1410, an intensity field of an incident light stream may be searched to identify a spatial subset of the intensity field that at least partially contains one or more atypical regions within the intensity field. The search may include: modulating the incident light stream with a first sequence of spatial patterns to produce a first modulated light stream (as indicated at 1410A); capturing samples of intensity of the first modulated light stream, where each of the samples is captured in response to a corresponding one of the spatial patterns of the first sequence (as indicated at 1410B); and selecting current spatial patterns to be injected into the first sequence of spatial patterns based on an analysis of the samples corresponding to previous spatial patterns of the first sequence (as indicated at 1410C).

At 1415, the incident light stream may be modulated with a first restricted spatial pattern corresponding to the spatial subset in order to produce a first restricted light stream. In other words, the first restricted spatial pattern is configured so that only portions of the incident light stream corresponding to the interior of the spatial subset are allowed to enter into the first restricted light stream.

At 1420, a spectral classification algorithm may be executed on a first restricted wavelength spectrum captured by measuring the first restricted light stream (e.g., using a spectrometer as variously described above). The execution of the spectral classification algorithm classifies the first restricted wavelength spectrum into one of a plurality of classes (e.g., classes corresponding to chemical plume species or groups of chemical plume species).

Additional embodiments are described in the following numbered paragraphs.

1. A method comprising: searching an intensity field of an incident light stream to identify a spatial subset of the intensity field that at least partially contains one or more atypical regions within the intensity field, wherein said searching includes: modulating the incident light stream with a first sequence of spatial patterns to produce a first modulated light stream; capturing samples of intensity of the first modulated light stream, wherein each of the samples is captured in response to a corresponding one of the spatial patterns of the first sequence; and selecting current spatial patterns to be injected into the first sequence of spatial patterns based on an analysis of the samples corresponding to previous spatial patterns of the first sequence; modulating the incident light stream with a first restricted spatial pattern corresponding to the spatial subset in order to produce a first restricted light stream; executing a spectral classification algorithm on a first restricted wavelength spectrum captured by measuring the first restricted light stream, wherein said executing classifies the first restricted wavelength spectrum into one of a plurality of classes.

2. The method of paragraph 1, wherein the one or more atypical regions have higher temperature than the average background temperature of the intensity field.

3. The system of paragraph 1, wherein portions of the incident light stream within the one or more atypical regions are spectrally distinct from portions of the incident light stream belonging to the exterior of the one or more atypical regions.

4. The method of paragraph 1, wherein said modulating the incident light stream with a first sequence of spatial patterns and said modulating the incident light stream with a second sequence of spatial patterns are performed using a digital micromirror device (DMD) having an array of mirrors, each configured to controllably switch between a first orientation state and a second orientation state, wherein the DMD has a first optical output path and a second optical output path corresponding respectively to the first orientation state and the second orientation state, wherein the first modulated light stream is outputted by the DMD onto the first optical output path, wherein the first restricted light stream is outputted by the DMD onto the second optical output path.

5. The method of paragraph 1, further comprising: in response to determining that said one of the classes into which the first restricted wavelength spectrum is classified is a class of interest, performing a refined search of the intensity field of the incident light stream to determine a refined spatial subset that more accurately contains the one or more atypical regions within the intensity field.

6. The method of paragraph 5, further comprising: modulating the incident light stream with a second restricted spatial pattern corresponding to the refined spatial subset to produce a second restricted light stream; and executing the spectral classification algorithm on a second restricted wavelength spectrum captured by measuring the second restricted light stream, wherein said executing the spectral classification algorithm on the second restricted wavelength spectrum classifies the second restricted wavelength spectrum relative to the plurality of classes (or perhaps, relative to a refined collection of classes).

7. The method of paragraph 6, wherein the second restricted wavelength spectrum is measured over a longer period of time than the first restricted wavelength spectrum.

8. The method of paragraph 1, wherein said searching the intensity field includes a recursive search that is based on a tree of subsets of the intensity field, wherein each of the spatial patterns of the first sequence corresponds to a unique one of the subsets of the tree, wherein the size of the subsets is a decreasing function of depth level within the tree.

9. The method of paragraph 8, wherein the tree is a quadtree corresponding to a recursive partitioning of the array of mirrors into rectangles.

10. The method of paragraph 8, wherein said searching the intensity field includes: computing a difference between the sample associated with a current subset of the tree and a mean intensity of other subsets at one or more levels of the tree no deeper than the current subset; comparing the difference to a threshold value; and exploring the subtree of the tree corresponding to the current subset in response to determining that the difference satisfies a predetermined inequality relative to the threshold value.

11. The method of paragraph 11, further comprising: performing said searching, said modulating the incident light stream with the first restricted spatial pattern and said executing a plurality of times (i.e., repeatedly over time) in order to track movement of the one or more atypical regions.

Adaptive Search Method Based on Tree of Subsets

In one set of embodiments, a method 1500 for adaptively searching an incident light field may involve the operations shown in FIG. 15. (Furthermore, the method 1500 may include any subset of the features, elements and embodiments described above in connection with FIGS. 1-14.) The method 1500 may be implemented, e.g., using system 600, or the system of FIG. 8, or system 1300, as variously described above.

At 1510, an intensity field of an incident light stream may be searched to identify a region of relatively high intensity within the intensity field. The search may be based on a tree of spatial subsets of the intensity field. (Subset inclusion is the condition that defines parent-child relationships between the spatial subsets. The size of the subsets is a decreasing function of depth level within the tree.) For a current depth level k of the tree, the search of the incident light field may include the operations 1520, 1525 and 1530 described below.

At 1520, the incident light stream may be modulated with a first sequence of spatial patterns to obtain a modulated light stream. The spatial patterns correspond to child subsets at the current depth level k whose parent subsets are search survivors at the previous depth level k−1.

At 1525, a histogram of measurements of intensity of the modulated light stream may be computed. The measurements are captured by measuring the intensity of the modulated light stream over time in response to the above-described action of modulating the incident light stream with the spatial patterns of the first sequence. Each measurement corresponds to a respective one of the spatial patterns. The measurements may be captured by a light sensing device, e.g., as described above in connection with system 100, or system realization 200, or system 1300. Alternatively, each of the measurements may be computed from a corresponding wavelength spectrum captured by a spectral sensing device, e.g., as described above in connection with system 600 or the system of FIG. 8.

At 1530, search survivors at the current depth level k may be selected from the child subsets, wherein the search survivors at the current depth level k correspond to the top P(k) percent of the intensity measurements in the histogram, where P(k) is a positive threshold value.

The process including operations 1520, 1525 and 1530 may be repeated a plurality of times, i.e., for successively increasing levels of depth k.

In some circumstances, the region identified by the search may be a union of isolated subregions within the intensity field.

In some embodiments, the threshold value P(k) is a strictly decreasing function (or alternatively, a strictly increasing function) of depth level k.

In some embodiments, the method 1500 may also include modulating the incident light stream with a second sequence of spatial patterns to obtain a second modulated light stream, wherein each of the spatial patterns of the second sequence is configured so that portions of the incident light stream internal to the region of relatively high intensity are prevented from entering into the second modulated light stream. Outside the region, the spatial patterns may be configured as CS measurement patterns. In response to the modulation of the incident light stream with the second sequence of spatial patterns, measurements of intensity of the second modulated light stream may be captured over time. (As described above, the measurements may be captured using a light sensing device, or indirectly, using a spectral sensing device.) Each of the measurements may correspond to a respective one of the spatial patterns. The intensity measurements of the may be stored in a memory, e.g., a memory of system 600 or system 1300. The intensity measurements of the second modulated light stream are usable to reconstruct an image representing the intensity field outside the region of relatively high intensity.

In some embodiments, the method 1500 may also include: modulating the incident light stream with a second sequence of spatial patterns to obtain a second modulated light stream, wherein each of the spatial patterns of the second sequence is configured so that portions of the incident light stream external to the region of relatively high intensity are prevented from entering into the second modulated light stream (and inside the region, the spatial patterns may be configured as CS measurement patterns); capturing measurements of intensity of the second modulated light stream over time; and storing the intensity measurements of the second modulated light stream in a memory. The intensity measurements of the second modulated light stream are usable to reconstruct an image representing the intensity field inside the region of relatively high intensity.

In some embodiments, the method 1500 may also include: modulating the incident light stream with a second sequence of spatial patterns to obtain a second modulated light stream, wherein each of the spatial patterns of the second sequence is configured so that portions of the incident light stream internal to the region of relatively high intensity are prevented from entering into the second modulated light stream (and outside the region, the spatial patterns may be configured as CS measurement patterns). In response to the modulation of the incident light stream with the second sequence of spatial patterns, a sequence of wavelength spectra of the second modulated light stream may be captured over time. Each wavelength spectrum corresponds to a respective one of the spatial patterns. (The wavelength spectra may be captured using the spectral sensing device of system 600 or the spectral sensing device of system 1300.) The sequence of wavelength spectra may be stored in a memory. The sequence of wavelength spectra is usable to reconstruct a multi-spectral data cube comprising a plurality of two-dimensional images. Each of the images represents the intensity field over a corresponding band of wavelengths and over the exterior of said region of relatively high intensity.

In some embodiments, the method 1500 may also include: modulating the incident light stream with a second sequence of spatial patterns to obtain a second modulated light stream, wherein each of the spatial patterns of the second sequence is configured so that portions of the incident light stream external to the region of relatively high intensity are prevented from entering into the second modulated light stream (and inside the region, the spatial patterns may be configured as CS measurement patterns); capturing a sequence of wavelength spectra of the second modulated light stream over time; and storing the sequence of wavelength spectra in a memory. The sequence of wavelength spectra is usable to reconstruct a multi-spectral data cube comprising a plurality of two-dimensional images. Each of the images represents the intensity field over a corresponding band of wavelengths and over the interior of said region of relatively high intensity.

In some embodiments, the tree used to perform the search 1520 is a quad tree. In some embodiments, the tree of spatial subsets corresponds to a recursive partitioning of the incident light field into rectangles.

Various additional embodiments are disclosed in the following numbered paragraphs.

1. A system comprising:
a light modulation unit configured to modulate the incident light stream, wherein the light modulation unit includes an array of light modulating elements;
a light sensing device; and
a processing unit configured to search an intensity field of the incident light stream to identify a region of relatively high intensity, wherein said searching is based on a tree of spatial subsets of the array of light modulating elements, wherein, for a current depth level k of the tree, said searching the incident light field includes:
directing the light modulating unit to modulate the incident light stream with a first sequence of spatial patterns so that the light modulation unit produces a modulated light stream, wherein the spatial patterns correspond to child subsets at the current depth level k whose parent subsets are search survivors at the previous depth level k−1;
computing a histogram of measurements of intensity of the modulated light stream captured by the light sensing device in response to said modulation of the incident light stream with the first sequence of spatial patterns; and
selecting search survivors at the current depth level k from the child subsets, wherein the search survivors at the current depth level k correspond to the top P(k) percent of the intensity measurements in the histogram, where P(k) is a positive threshold value.

2. The system of paragraph 1, wherein the region comprises a union of isolated subregions within the intensity field.

3. The system of paragraph 1, wherein the threshold value P(k) in a strictly decreasing function or a strictly increasing function of depth level k.

4. The system of paragraph 1, wherein the processing unit is further configured to: direct the light modulation unit to modulate the incident light stream with a second sequence of spatial patterns to obtain a second modulated light stream, wherein each of the spatial patterns of the second sequence is configured so that portions of the incident light stream internal to the region of relatively high intensity are prevented from entering into the second modulated light stream (and outside the region, the spatial patterns may be configured as CS measurement patterns); receiving measurements of intensity of the second modulated light stream captured over time by the light sensing device; storing the intensity measurements of the second modulated light stream in a memory, wherein the intensity measurements of the second modulated light stream are usable to reconstruct an image representing the intensity field outside the region of relatively high intensity.

5. The system of paragraph 1, wherein the processing unit is further configured to: direct the light modulation unit to modulate the incident light stream with a second sequence of spatial patterns to obtain a second modulated light stream, wherein each of the spatial patterns of the second sequence is configured so that portions of the incident light stream external to the region of relatively high intensity are prevented from entering into the second modulated light stream (and inside the region, the spatial patterns may be configured as CS measurement patterns); receiving measurements of intensity of the second modulated light stream captured over time by the light sensing device; storing the intensity measurements of the second modulated light stream in a memory, wherein the intensity measurements of the second modulated light stream are usable to reconstruct an image representing the intensity field inside the region of relatively high intensity.

6. The system of paragraph 1, wherein the processing unit is further configured to: direct the light modulation unit to modulate the incident light stream with a second sequence of spatial patterns to obtain a second modulated light stream, wherein each of the spatial patterns of the second sequence is configured so that portions of the incident light stream internal to the region of relatively high intensity are prevented from entering into the second modulated light stream (and outside the region, the spatial patterns may be configured as CS measurement patterns); receiving a sequence of wavelength spectra of the second modulated light stream, wherein the wavelength spectra are captured over time by a spectral sensing device configured to receive the second modulated light stream; storing the sequence of wavelength spectra, wherein sequence of wavelength spectra are usable to reconstruct a multi-spectral data cube comprising a plurality of two-dimensional images, wherein each of the images represents the intensity field over a corresponding band of wavelengths and over the exterior of said region.

7. The system of paragraph 1, wherein the processing unit is further configured to: direct the light modulation unit to modulate the incident light stream with a second sequence of spatial patterns to obtain a second modulated light stream, wherein each of the spatial patterns of the second sequence is configured so that portions of the incident light stream external to the region of relatively high intensity are prevented from entering into the second modulated light stream (and inside the region, the spatial patterns may be configured as CS measurement patterns); receiving a sequence of wavelength spectra of the second modulated light stream, wherein the wavelength spectra are captured over time by a spectral sensing device configured to receive the second modulated light stream; storing the sequence of wavelength spectra, wherein sequence of wavelength spectra are usable to reconstruct a multi-spectral data cube comprising a plurality of two-dimensional images, wherein each of the images represents the intensity field over a corresponding band of wavelengths and over the interior of said region.

8. The system of paragraph 1, wherein the tree is a quad tree.

9. The system of paragraph 1, wherein the tree of spatial subsets corresponds to a recursive partitioning of the array of light modulating elements into rectangles.

Example Implementation of Tree-Based Search

This section describes an example implementation of a tree-based search. Any subset of the features, elements or operations in this section may be incorporated in any of the above-described systems and methods, and vice versa.

In some embodiments, coarse-to-fine isolation may be used in a compressive sensing imager to spatially locate optical signals of particularly low or high intensity. Once isolated to a set of mirrors, signals can then be highlighted for analysis or masked off to improve dynamic range elsewhere. The areas of isolation are determined in a manner that is efficient for a compressive sensing imager with a light modulation unit such as a DMD.

Coarse-to-fine isolation is determined in a multi-scale fashion. The signal isn't restricted to a single continuous area. Instead, isolation proceeds iteratively down the branches of a quadtree selecting multiple independent areas for isolation. At each level of depth, iteration continues down to a node's children if that node's signal meets a specified threshold. The optical scene is first analyzed at the shallowest depth, where each quad represents a large pixel area.

Large superpixels have a high SNR, but the signal is being integrated over the entire area of the pixel. The signal that is being sought for isolation is contaminated with a large number of background signals. To combat the contamination of the target signal with background signals at shallower depths, a less strict threshold is used for isolation. As iterations down the quadtree continue, contamination will be lower, and isolation will become increasingly strict.

FIG. 16 illustrates a quadtree that is overlayed with a set of point signals. (Courtesy of Wikimedia Commons http://en.wikipedia.org/wiki/File:Point_quadtree.svg.)

Figure 17:
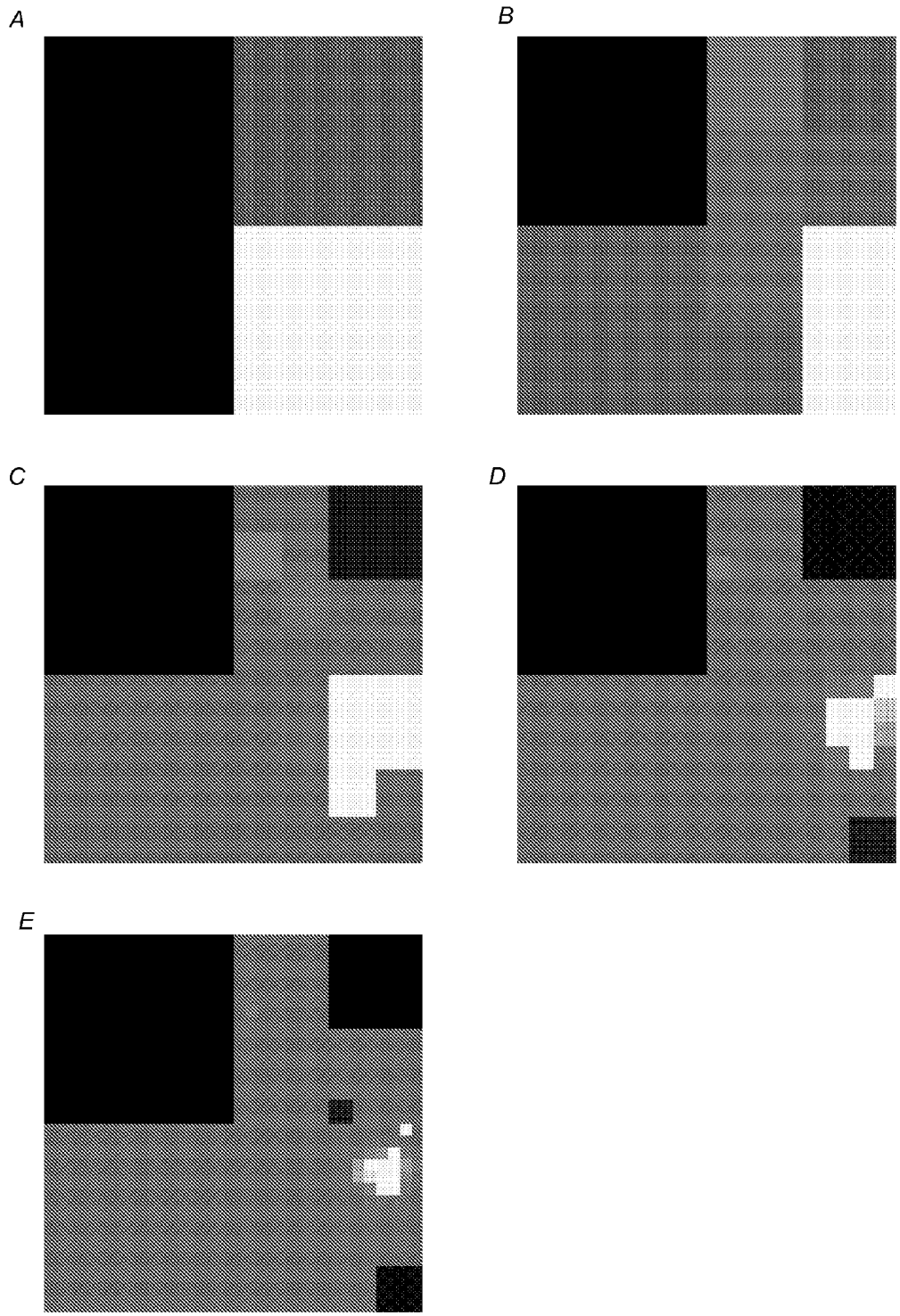
FIG. 17 illustrates one embodiment of a tree-based search for a spot that occurs in the lower right of the field of view. The intensities of nodes at each stage of the search are indicated in gray scale. The search progresses from coarse resolution at stage A to fine resolution at stage E.
Figure 18:
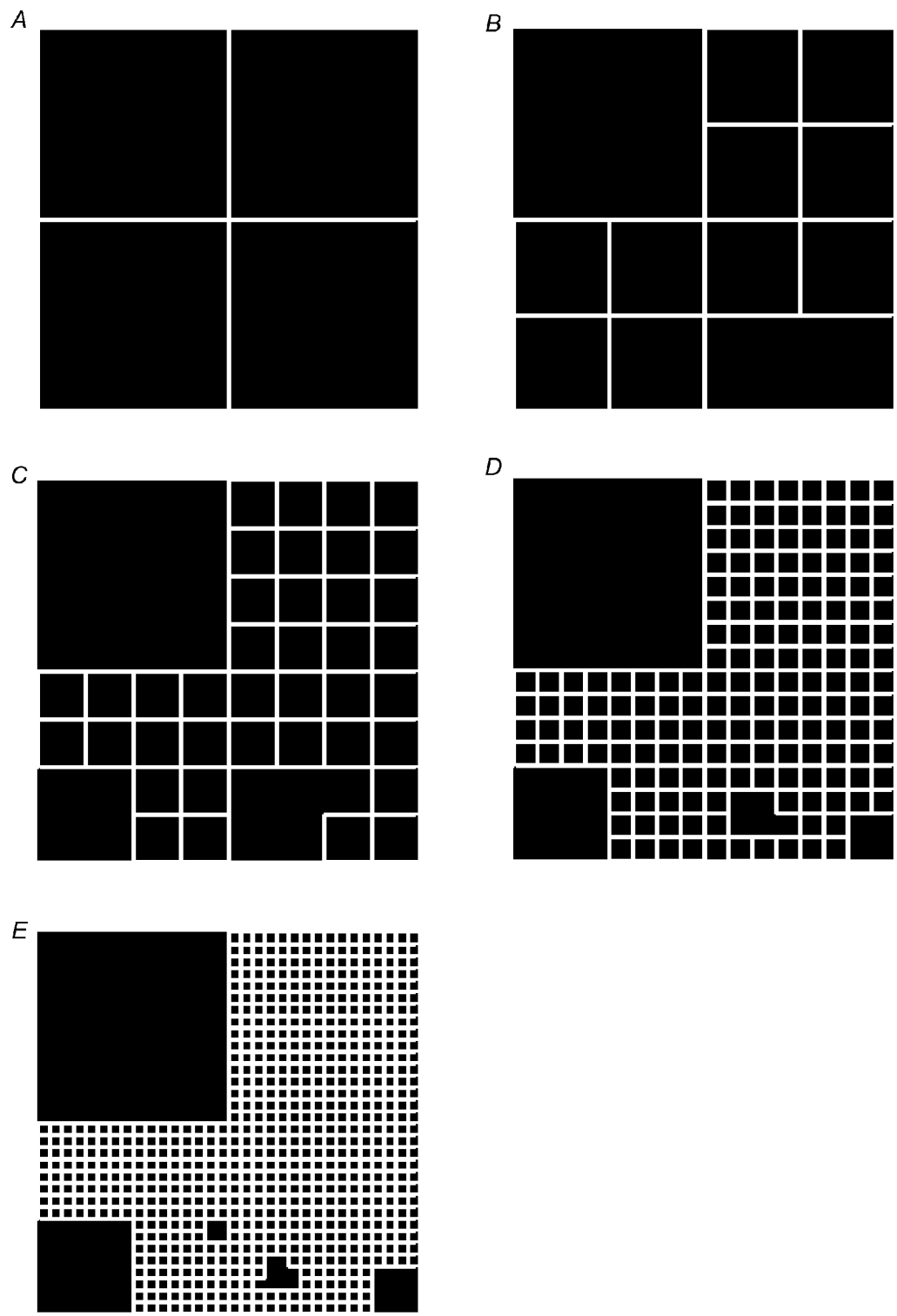
FIG. 18 shows the outline of the nodes (rectangles) at each stage of the search depicted in FIG. 17.
Figure 19A:
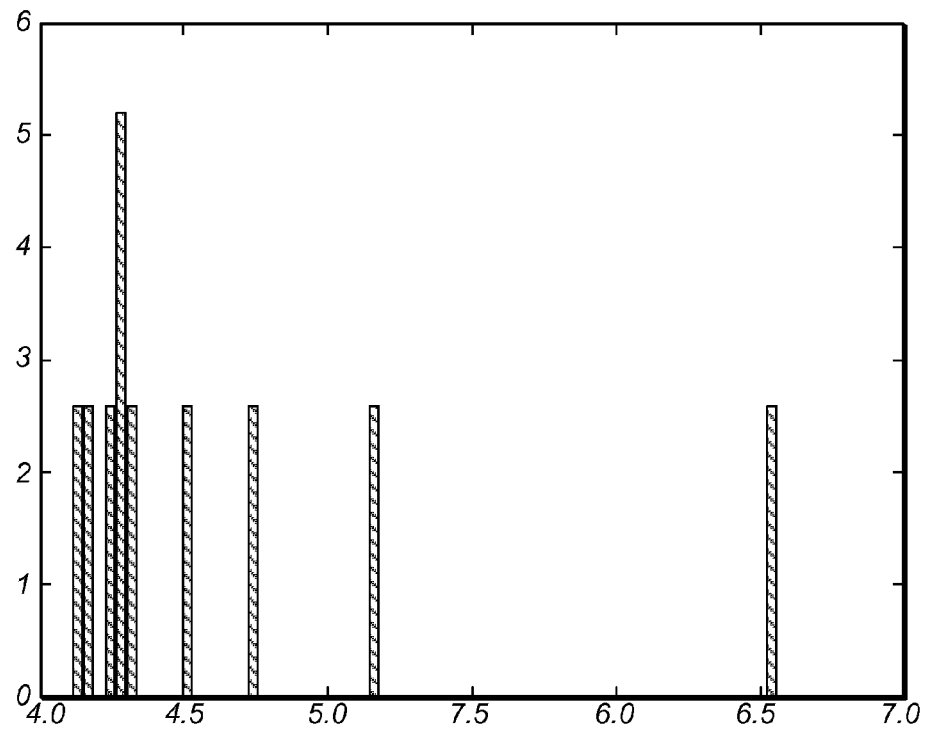
FIGS. 19A-D show histograms corresponding respectively to the last four images shown in FIG. 17.
Figure 19B:
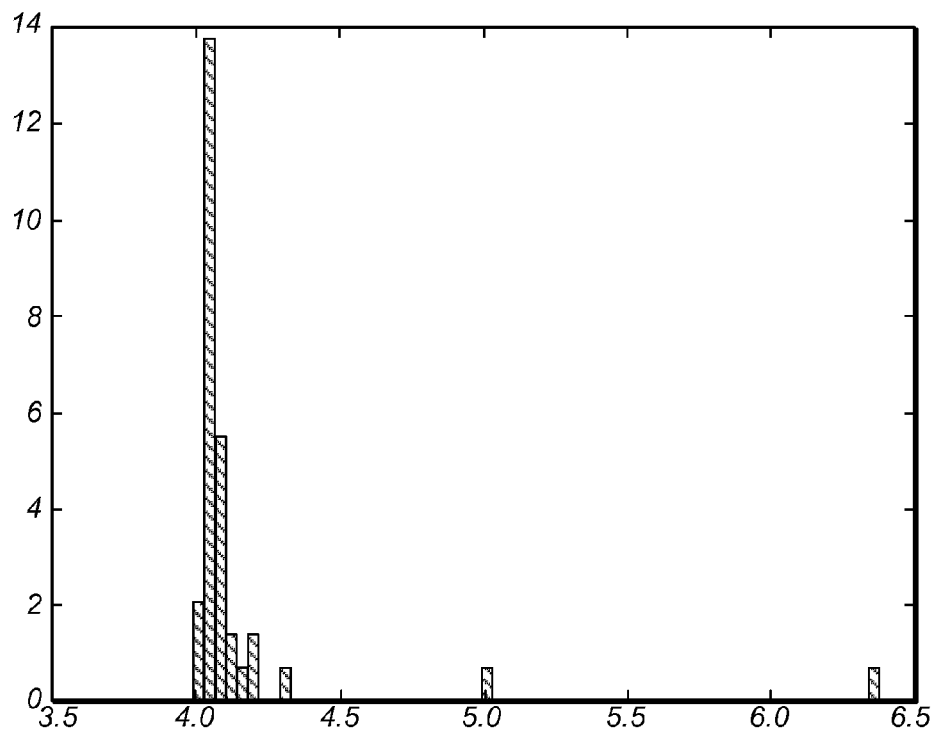
Figure 19C:
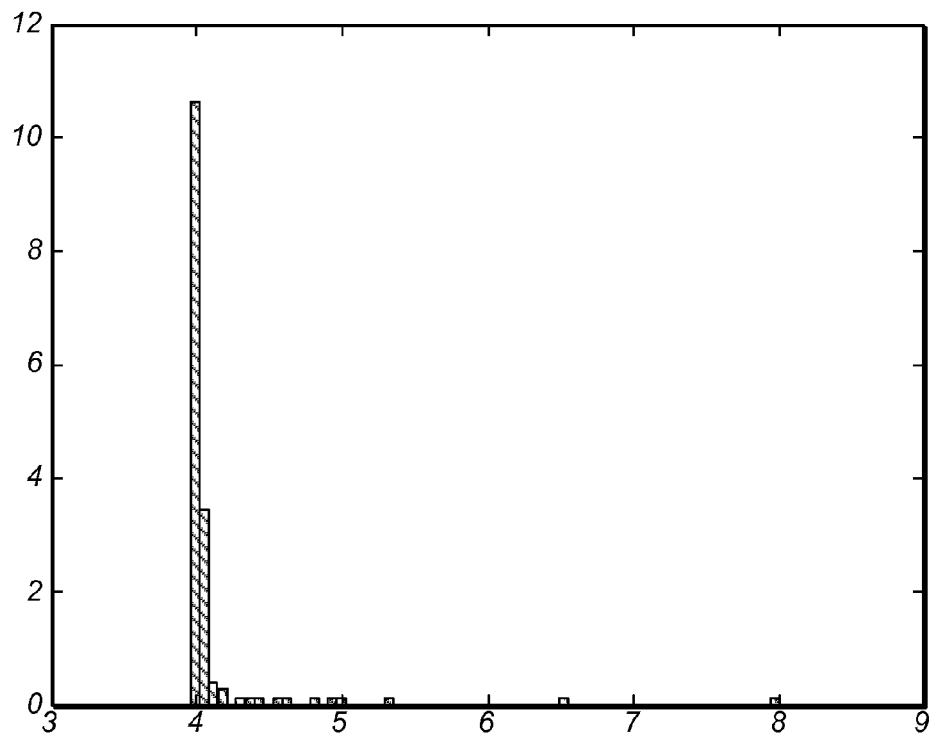
Figure 19D:
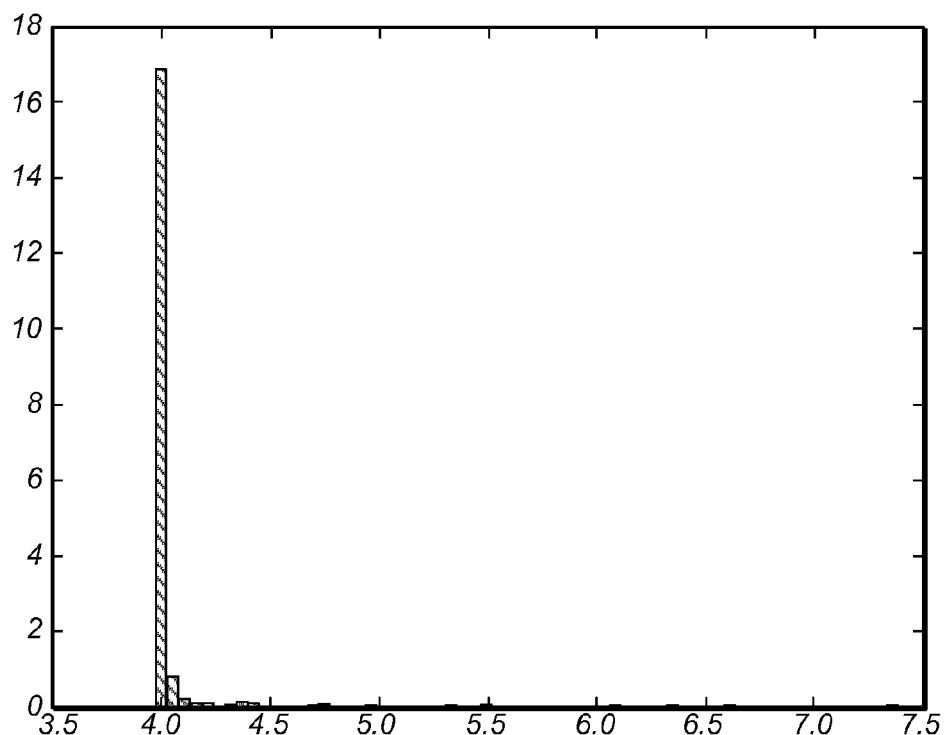

FIG. 17 shows the scene intensity at successive stages of the search, highlighting a spot at the lower right. Intensity is represented in shades of gray. Each successive search searches survivor nodes down to the next deeper level. FIG. 18 shows the outline of the tree nodes (rectangles) at successive stages of the search. Each rectangle is realized by turning on a corresponding block of mirrors on the DMD. Note that not all branches are explored down to the same level of depth. Branches away from the spot tend to terminate earlier.

The isolation threshold is based on the distribution of pixel values at the current tree depth. Observing the histograms at increasing levels of depth, at the coarser scales the histograms are flatter than the image scene appears to be. See FIGS. 19A-D. The histogram distortion is due to the high contamination of target signal with background signal, and only gives us confidence to reject the lowest few percent of values as not containing a high value signal. As the depth increases, the quadtree's histogram more closely approximates the histogram of the image scene.

For a quadtree of depth D, we iteratively decide which branches to investigate at a deeper depth. For the first D−1 levels, only branches with intensity in the lowest (k*tree depth)−% of values are discarded and not investigated further. At the final level D, the highest valued branches at the upper end of the distribution are selected for isolation. What percentage of the distribution is isolated may be determined by the histogram distribution and user input.

FIGS. 19A-D show histograms corresponding to the 4 deepest quadtree images of FIG. 17. In the first two depths, only the pixels in the leftmost bin of the histogram are discarded. In the final depth, the pixels in the bins for values 4.5 and greater are selected for isolation. (This value for the threshold may is not meant to be a general limitation. Different threshold may be used in different circumstances, e.g., different signal environments and different application scenarios.)

After the isolation proceeds to the specified depth, the pixels that still meet the isolation threshold are used to create a mask. In the mask image, the isolated pixels are set to on and the rest of the image will be set to off To account for the error of the spatially-rigid structure of a quadtree, the mask may be transformed to increase the isolated area and enforce a more natural scene geometry than the quadtree. The mask may put through morphological dilate-and-open methods to expand and smooth the geometry of the isolated signal.

Figure 20:
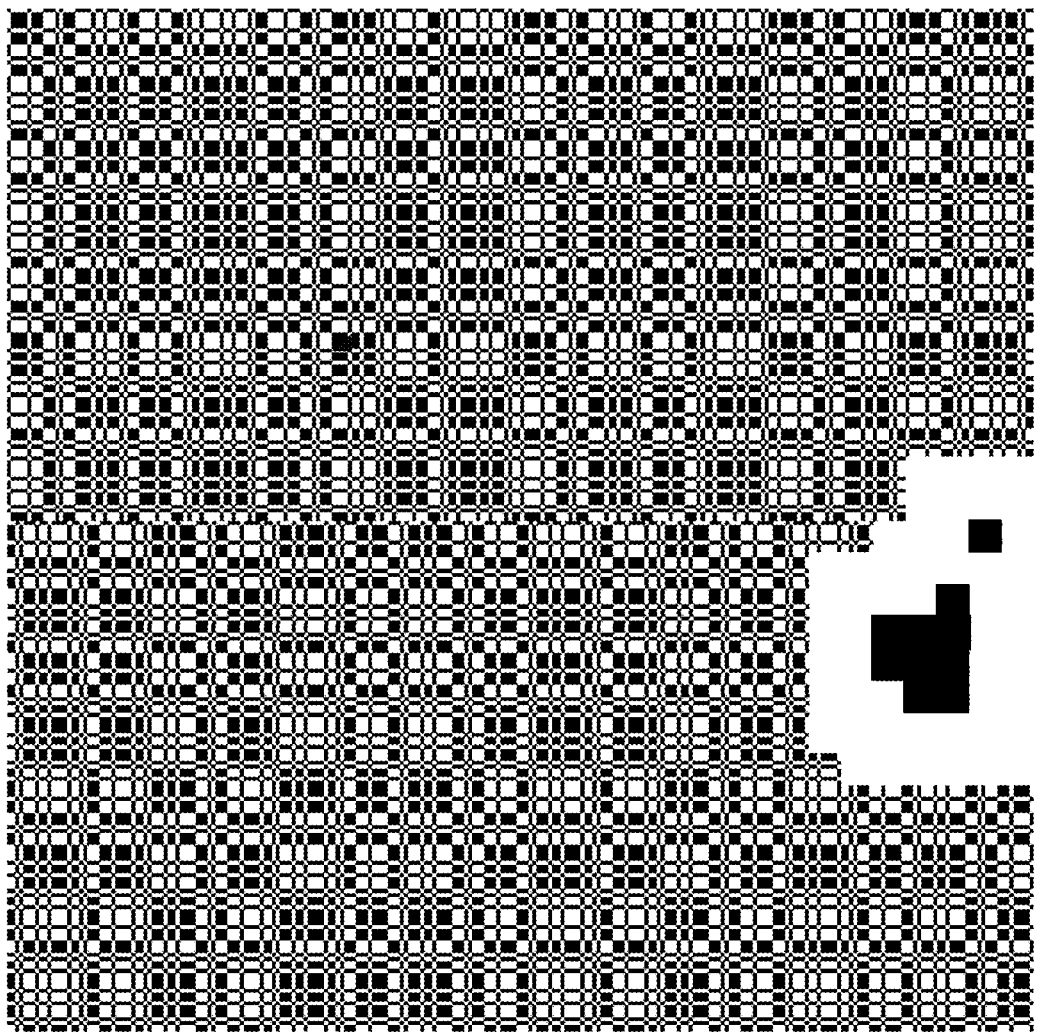
FIG. 20 shows a spatial pattern that may be used to modulate the incident light stream (see FIG. 6 or FIG. 13). The spatial pattern has been masked to remove the spot that has been identified by the search process.

FIG. 20 shows a modulation pattern with mask applied. The gray areas (i.e., the two solid areas at the right which are bounded by white) indicate the union of tree branches that met the final intensity threshold. The white area surrounding the gray areas indicates the extent of the expanded mask.

The principles of the present invention are not limited to light. Various embodiments are contemplated where the signals being processed are electromagnetic waves or particle beams or seismic waves or acoustic waves or surface waves on a boundary between two fluids or gravitational waves. In each case, a space-time signal is directed to an array of signal-modulating elements whose transmittances or reflectances are individually varied so as to modulate the space-time signal with a time sequence of spatial patterns. The modulated space-time signal is spatially separated (e.g., diffracted) into a continuous fan of wavelength components. The continuous fan is directed to an array of transducers. Each element of the array receives a corresponding portion of the continuous fan, and thus, is sensitive to a corresponding interval of wavelengths. The array of transducers captures a temporal sequence of wavelength spectra $\{I_k(\lambda)\}$. Each wavelength spectrum $I_k(\lambda)$ of the temporal sequence corresponds to a respective one of the spatial patterns. The wavelength spectra $\{I_k(\lambda)\}$ may be processed as variously described above to reconstruct a multispectral datacube representing the original space-time signal over two spatial dimensions and the wavelength dimension.

Compressive Imaging System 2100

Figure 21:
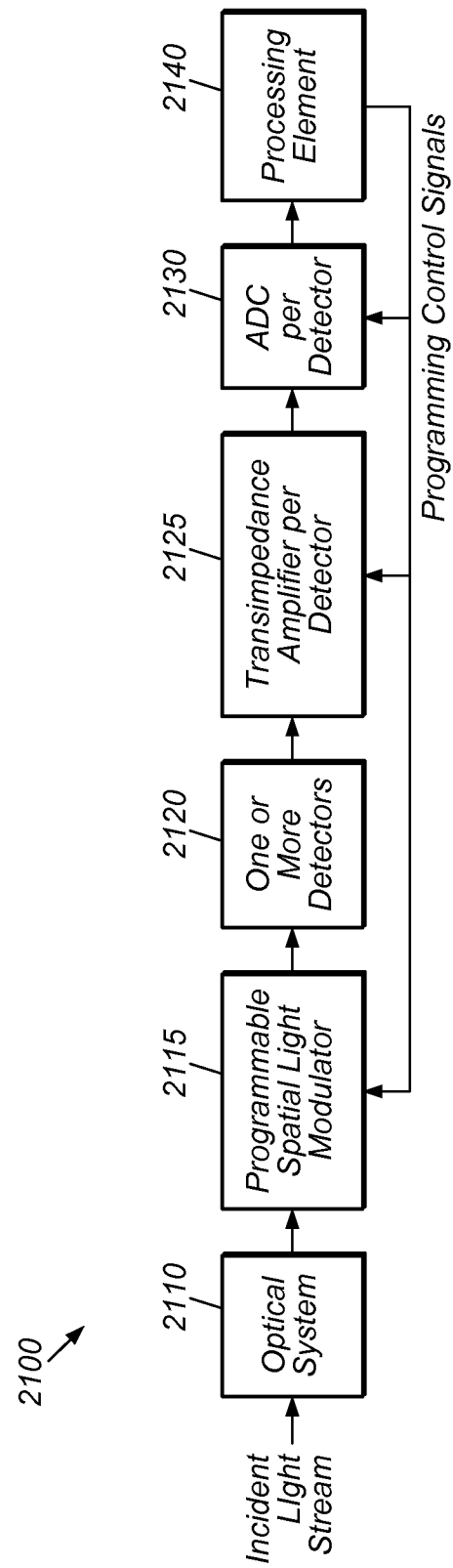
FIG. 21 illustrates one embodiment of a compressive imaging system 2100 including one or more detector channels.

In one set of embodiments, a compressive imaging system 2100 may be configured as shown in FIG. 21. The compressive imaging (CI) system may include an optical system 2110, a spatial light modulator 2115, a set 2120 of one or more photodetectors, a set 2125 of one or more amplifiers (i.e., one amplifier per detector), a set 2130 of analog-to-digital converters (one ADC per detector), and a processing element 2140.

The optical system 2110 focuses an incident light stream onto the spatial light modulator 2115, e.g., as variously described above. See the discussion above regarding optical subsystem 105. The incident light stream carries an image (or a spectral ensemble of images) that is to be captured by the CI system in compressed form.

The spatial light modulator 2115 modulates the incident light stream with a sequence of spatial patterns to obtain a modulated light stream, e.g., as variously described above.

Each of the detectors 2120 generates a corresponding electrical signal that represents the intensity of a corresponding portion of the modulated light stream, e.g., a spatial portion or a spectral portion of the modulated light stream.

Each of the amplifiers 2125 (e.g., transimpedance amplifiers) amplifies the corresponding detector signal to produce a corresponding amplified signal.

Each of the ADCs 2130 acquires samples of the corresponding amplified signal.

The processing element 2140 may operate on the sample sets obtained by the respective ADCs to reconstruct respective images. The images may represent spatial portions or spectral slices of the incident light stream. Alternatively, or additionally, the processing element may send the sample sets to a remote system for image reconstruction.

The processing element 2140 may include one or more microprocessors configured to execute program instructions stored in a memory medium.

The processing element 2140 may be configured to control one or more other elements of the CI system. For example, in one embodiment, the processing element may be configured to control the spatial light modulator 2115, the transimpedance amplifiers 2125 and the ADCs 2130.

The processing element 2140 may be configured to perform any subset of the above-described methods on any or all of the detector channels.

Compressive Imaging System 2200

Figure 22:
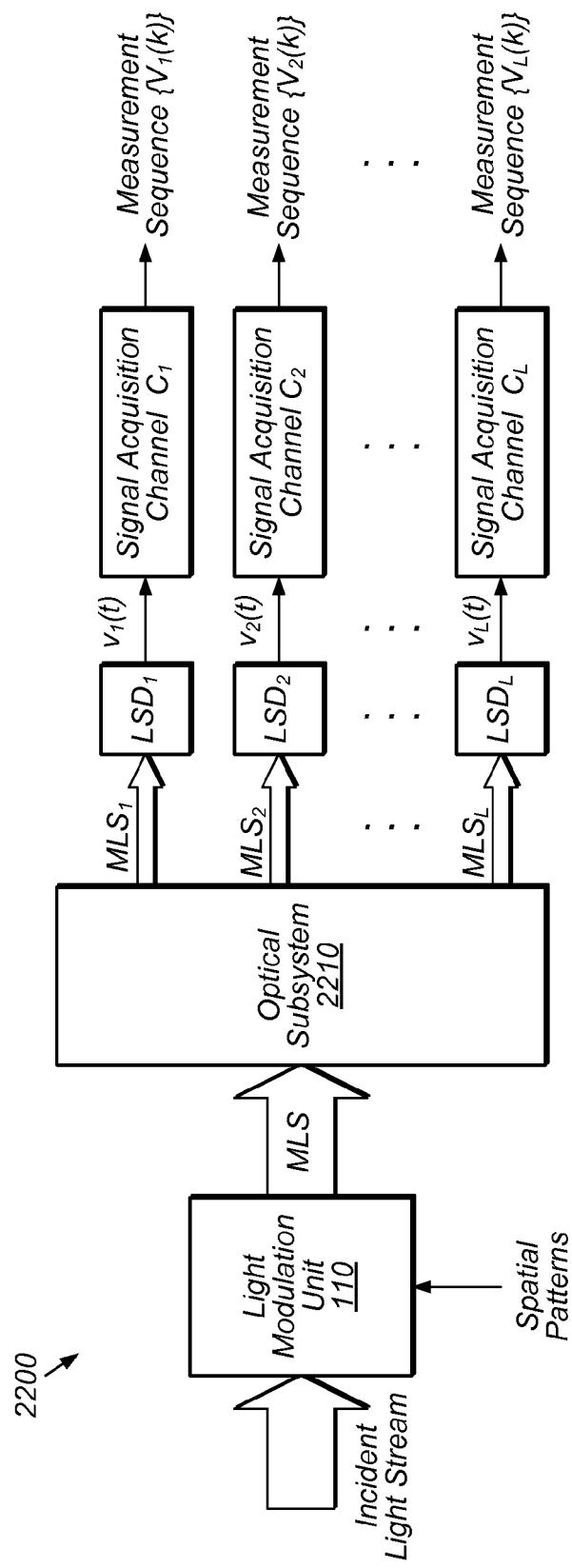
FIG. 22 illustrates one embodiment of a compressive imaging system 2200 where separate portions of the modulated light stream MLS are delivered to respective light sensing devices.

In one set of embodiments, a compressive imaging system 2200 may be configured as shown in FIG. 22. The compressive imaging system includes the light modulation unit 110 as variously described above, and also includes optical subsystem 2210, a set of L light sensing devices $LSD_1$ through $LSD_L$, and a set of L signal acquisition channels $C_1$ through $C_L$, where L in a positive integer.

The light modulation unit 110 receives an incident light stream and modulates the incident light stream with a sequence of spatial patterns to obtain a modulated light stream MLS, e.g., as variously described above.

The optical subsystem 2210 delivers portions (e.g., spatial portions or spectral portions) of the modulated light stream to corresponding ones of the light sensing devices $LSD_1$ through $LDS_L$.

For information on various mechanisms for delivering spatial subsets of the modulated light stream to respective light sensing devices, please see U.S. patent application Ser. No. 13/197,304, filed on Aug. 3, 2011, titled "Decreasing Image Acquisition Time for Compressive Imaging Devices", invented by Woods et al., which is hereby incorporated by reference in its entirety as though fully and completely set forth herein.

In some embodiments, the optical subsystem 2210 includes one or more lenses and/or one or more mirrors arranged so as to deliver spatial portions of the modulated light stream onto respective ones of the light sensing devices. For example, in one embodiment, the optical subsystem 2210 includes a lens whose object plane is the plane of the array of light modulating elements and whose image plane is a plane in which the light sensing devices are arranged. (The light sensing devices may be arranged in an array.)

In some embodiments, optical subsystem 2210 is configured to separate the modulated light stream into spectral components and deliver the spectral components onto respective ones of the light sensing devices. For example, optical subsystem 1410 may include a grating, a prism, a spectrometer, or a tunable filter such as a Fabry-Perot Interferometer to achieve the spectral separation.

Each light sensing device $LSD_j$ generates a corresponding electrical signal $v_j(t)$ that represents intensity of the corresponding portion $MLS_j$ of the modulated light stream.

Each signal acquisition channel C, acquires a corresponding sequence of samples $\{V_j(k)\}$ of the corresponding electrical signal $v_j(t)$. Each signal acquisition channel may include a corresponding amplifier (e.g., a TIA) and a corresponding A/D converter.

The sample sequence $\{V_j(k)\}$ obtained by each signal acquisition channel may be used to reconstruct a corresponding sub-image which represents a spatial portion or a spectral slice of the incident light stream. The number of samples m in each sample sequence $\{V_j(k)\}$ may be less than (typically much less than) the number of pixels in the corresponding sub-image. Thus, each signal acquisition channel $C_j$ may operate as a compressive sensing camera for a spatial portion or spectral portion of the incident light.

Each of the signal acquisition channels may include any subset of the embodiments, features, and elements described above.

Any of the various embodiments described herein may be combined to form composite embodiments. Furthermore, any of the various features, embodiments and elements described in U.S. Provisional Application No. 61/541,582 (filed Sep. 30, 2011) may be combined with any of the various embodiments described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a light modulation unit configured to modulate the incident light stream, wherein the light modulation unit includes an array of light modulating elements;
   a spectral sensing device;
   a processing unit configured to:
      search an intensity field of the incident light stream to identify a spatial subset of the intensity field that at least partially contains one or more atypical regions within the intensity field, wherein said searching the intensity field includes: (a) directing the light modulation unit to modulate the incident light stream with a first sequence of spatial patterns so that the light modulation unit produces a first modulated light stream; (b) receiving wavelength spectra of the first modulated light stream from the spectral sensing device, wherein each of the wavelength spectra is measured by the spectral sensing device in response to a corresponding one of the spatial patterns of the first sequence; (c) selecting current spatial patterns to be injected into the first sequence of spatial patterns based on an analysis of the wavelength spectra corresponding to previous spatial patterns of the first sequence;
      direct the light modulation unit to modulate the incident light stream with a first restricted spatial pattern so the light modulation unit produces a first restricted light stream, where the first restricted spatial pattern is restricted to the spatial subset; and
      execute a spectral classification algorithm on a first restricted wavelength spectrum measured by the spectral sensing device in response to the first restricted light stream, wherein said executing classifies the first restricted wavelength spectrum into one of a plurality of classes.

2. The system of claim 1, wherein the one or more atypical regions within the incident light field have a higher temperature than the average background temperature of the incident light field.

3. The system of claim 1, wherein portions of the incident light stream within the one or more atypical regions are spectrally distinct from portions of the incident light stream belonging to the exterior of the one or more atypical regions.

4. The system of claim 1, wherein the light modulation unit is a digital micromirror device (DMD).

5. The system of claim 1, wherein the processing unit is further configured to:
in response to determining that said one of the classes into which the first restricted wavelength spectrum is classified is a class of interest, perform a refined search of the intensity field of the incident light stream to determine a refined spatial subset that more accurately contains the one or more atypical regions within the intensity field.

6. The system of claim 5, wherein the processing unit is further configured to:
direct the light modulation unit to modulate the incident light stream with a second restricted spatial pattern to obtain a second restricted light stream, where the second restricted spatial pattern is restricted to the refined spatial subset;
execute the spectral classification algorithm on a second restricted wavelength spectrum generated by the spectral sensing device in response to the second restricted light stream, wherein said executing the spectral classification algorithm on the second restricted wavelength spectrum classifies the second restricted wavelength spectrum relative to the plurality of classes.

7. The system of claim 6, wherein the second restricted spatial pattern is applied by the light modulation unit to the incident light stream for a longer duration than a duration of application of the first restricted spatial pattern, wherein the spectral sensing device measures the second restricted wavelength spectrum for a longer period of time than the first restricted wavelength spectrum.

8. The system of claim 1, wherein said searching of the intensity field includes a recursive search that is based on a tree of subsets of the array of light modulating elements, wherein each of the search patterns is restricted to a corresponding one of the subsets, wherein the size of the subsets is a decreasing function of depth level within the tree.

9. The system of claim 8, wherein the tree is a quad tree.

10. The system of claim 8, wherein the tree of subsets corresponds to a recursive partitioning of the array of light modulating elements into rectangles.

11. The system of claim 1, wherein the spectral sensing device is a spectrometer.

12. The system of claim 1, wherein the one or more atypical regions have a higher light intensity than an exterior of the one or more atypical regions, wherein said searching is based on a tree of subsets of the array of light modulating elements, wherein, for a current depth level k of the tree, wherein (a) includes injecting current spatial patterns into the first sequence of spatial patterns, wherein the current spatial patterns correspond to child subsets at the current depth level k whose parent subsets are search survivors at the previous depth level k−1, wherein (c) includes:
computing a histogram of intensity values of the first modulated light stream, wherein the intensity values correspond respectively to the current spatial patterns; and
selecting search survivors at the current depth level k from the child subsets, wherein the search survivors at the current depth level k correspond to the top P(k) percent of the intensity values in the histogram, where P(k) is a positive threshold value.

13. The system of claim 12, wherein each of the intensity values of the first modulated light stream is computed from the corresponding wavelength spectrum.

14. The system of claim 12, wherein the threshold value P(k) is a strictly decreasing function of depth level k.

15. The system of claim 12, wherein the threshold value P(k) is a strictly increasing function of depth level k.

16. The system of claim 12, wherein the processing unit is further configured to:
direct the light modulation unit to modulate the incident light stream with a second sequence of spatial patterns to obtain a second modulated light stream, wherein each of the spatial patterns of the second sequence is configured so that portions of the incident light stream external to the identified spatial subset are prevented from entering into the second modulated light stream;
receive measurements of intensity of the second modulated light stream, wherein the intensity measurements correspond respectively to the spatial patterns of the second sequence; and
store the intensity measurements of the second modulated light stream in a memory, wherein the intensity measurements of the second modulated light stream are usable to reconstruct an image representing the intensity field inside the identified spatial subset.

17. The system of claim 12, wherein the processing unit is further configured to:
direct the light modulation unit to modulate the incident light stream with a second sequence of spatial patterns to obtain a second modulated light stream, wherein each of the spatial patterns of the second sequence is configured so that portions of the incident light stream external to the identified spatial subset are prevented from entering into the second modulated light stream;
receive wavelength spectra of the second modulated light stream, wherein the wavelength spectra are captured over time by the spectral sensing device; and
store the wavelength spectra of the second modulated light stream in a memory, wherein the wavelength spectra of the second modulated light stream are usable to reconstruct a plurality of images, wherein each of the images represents the intensity field over a corresponding band of wavelengths and over the interior of the identified spatial subset.

18. The system of claim 1, further comprising: an optical subsystem configured to focus the first modulated light stream and the first restricted light stream on a light input port of the spectral sensing device.

19. A method comprising:
performing a set of operations by a processing unit, wherein the set of operations includes:
searching an intensity field of an incident light stream to identify a spatial subset of the intensity field that at least partially contains one or more atypical regions within the intensity field, wherein said searching the intensity field includes:
(a) directing an action of modulating the incident light stream with a sequence of spatial patterns to obtain a modulated light stream;
(b) for each of the spatial patterns, receiving a corresponding wavelength spectrum of the modulated light stream, wherein the corresponding wavelength spectrum has been measured by a spectral sensing device;
(c) selecting current spatial patterns to be injected into the sequence of spatial patterns based on an analysis of the wavelength spectra corresponding to previous spatial patterns of the sequence;
directing an action of modulating the incident light stream with a first restricted spatial pattern to obtain a first restricted light stream, wherein the first restricted spatial pattern is restricted to the spatial subset;

executing a spectral classification algorithm on a first restricted wavelength spectrum captured by measuring the first restricted light stream, wherein said executing classifies the first restricted wavelength spectrum into one of a plurality of classes.

20. The method of claim 19, wherein the one or more atypical regions have higher temperature than the average background temperature of the intensity field.

21. The method of claim 19, wherein portions of the incident light stream within the one or more atypical regions are spectrally distinct from portions of the incident light stream belonging to the exterior of the one or more atypical regions.

22. The method of claim 19, wherein the one or more atypical regions correspond respectively to one or more chemical plumes.

23. The method of claim 19, wherein the set of operations also includes:
in response to determining that said one of the classes into which the first restricted wavelength spectrum is classified is a class of interest, performing a refined search of the intensity field of the incident light stream to determine a refined spatial subset that more accurately contains the one or more atypical regions within the intensity field.

24. The method of claim 23, wherein the set of operations also includes:
directing an action of modulating the incident light stream with a second restricted spatial pattern to obtain a second restricted light stream, where the second restricted spatial pattern is restricted to the refined spatial subset;
executing the spectral classification algorithm on a second restricted wavelength spectrum captured by measuring the second restricted light stream, wherein said executing the spectral classification algorithm on the second restricted wavelength spectrum classifies the second restricted wavelength spectrum relative to said plurality of classes.

25. The method of claim 24, wherein a time period of measurement of the second restricted wavelength spectrum is longer than a time period of measurement of the first restricted wavelength spectrum.

26. The method of claim 19, wherein said searching of the intensity field includes a recursive search that is based on a tree of subsets of the intensity field, wherein each of the spatial patterns is restricted to a corresponding one of the subsets of the intensity field, wherein the size of the subsets is a decreasing function of depth level within the tree.

27. The method of claim 26, wherein the tree of subsets is a quadtree corresponding to a recursive partitioning of the intensity field into rectangles.

28. The method of claim 26, wherein said searching the intensity field includes computing a total intensity for each of the wavelength spectra, wherein said searching also includes:
computing a difference between the total intensity associated with a current subset of the tree and a mean intensity of other subsets at one or more levels of the tree no deeper than the level of the current subset; and
comparing the difference to a threshold value; and
exploring a subtree of the tree corresponding to the current subset in response to determining that the difference is greater than the threshold value.

29. The method of claim 26, wherein said searching the intensity field includes:
computing a test statistic for a current subset of the tree based on an RX anomaly detection algorithm, wherein the test statistic is computed based on the wavelength spectra corresponding to the current subset and to other subsets of the tree, wherein the other subsets are at one or more levels of the tree no deeper than the level of the current subset;
comparing the test statistic to a threshold value; and
exploring a subtree of the tree corresponding to the current subset in response to determining that the test statistic is greater than the threshold value.

30. The method of claim 19, wherein each of the wavelength spectra covers at least the short wavelength infrared (SWIR) wavelength band.

31. The method of claim 19, wherein the set of operations also includes:
directing an action of modulating the incident light stream with a sequence of compressive sensing patterns to obtain a third modulated light stream;
for each of the compressive sensing patterns, receiving a corresponding wavelength spectrum of the third modulated light stream, wherein the corresponding wavelength spectrum is measured by the spectrum sensing device.

32. The method of claim 19, wherein the set of operations also includes:
performing said searching, said modulating the incident light stream with the first restricted spatial pattern and said executing a plurality of times in order to track movement of the one or more atypical regions.

33. The method of claim 19, wherein the one or more atypical regions have higher light intensity than an exterior of the one or more atypical regions, wherein said searching is based on a tree of subsets of the intensity field, wherein, for a current depth level k of the tree, (a) includes injecting current spatial patterns into the sequence of spatial patterns, wherein the current spatial patterns correspond to child subsets at the current depth level k whose parent subsets are search survivors at the previous depth level k−1, wherein (c) includes:
computing a histogram of intensity values of the modulated light stream corresponding respectively to the current spatial patterns; and
selecting search survivors at the current depth level k from the child subsets, wherein the search survivors at the current depth level k correspond to the top P(k) percent of the intensity values in the histogram, where P(k) is a positive threshold value.

34. The method of claim 33, wherein the intensity values of the modulated light stream are computed respectively from the wavelength spectra corresponding to the current spatial patterns.

35. The system of claim 33, wherein the threshold value P(k) is a strictly decreasing function or a strictly increasing function of depth level k.

36. The method of claim 33, wherein the set of operations also includes:
directing an action of modulating the incident light stream with a second sequence of spatial patterns to obtain a second modulated light stream, wherein each of the spatial patterns of the second sequence is configured so that portions of the incident light stream external to the identified spatial subset are prevented from entering into the second modulated light stream;
receiving measurements of intensity of the second modulated light stream over time;
storing the intensity measurements of the second modulated light stream, wherein the intensity measurements of the second modulated light stream are usable to reconstruct an image representing the intensity field within the identified spatial subset.

37. The method of claim 33, wherein the set of operations also includes:

directing an action of modulating the incident light stream with a second sequence of spatial patterns to obtain a second modulated light stream, wherein each of the spatial patterns of the second sequence is configured so that portions of the incident light stream external to the identified spatial subset are prevented from entering into the second modulated light stream;

receiving a sequence of wavelength spectra of the second modulated light stream over time;

storing the sequence of wavelength spectra of the second modulated light stream, wherein sequence of wavelength spectra of the second modulated light stream are usable to reconstruct a multi-spectral data cube comprising a plurality of two-dimensional images, wherein each of the two-dimensional images represents the intensity field over a corresponding band of wavelengths and over the interior of the identified spatial subset.

38. The method of claim 37, wherein the set of operations also includes:

performing a morphological dilate-and-open transformation on the spatial subset prior to said modulating the incident light stream with a first restricted spatial pattern.

* * * * *